(12) United States Patent
Hudson et al.

(10) Patent No.: US 10,455,521 B2
(45) Date of Patent: Oct. 22, 2019

(54) APPARATUS AND METHOD FOR COMMUNICATIONS MANAGEMENT

(71) Applicant: BAE SYSTEMS PLC, London (GB)

(72) Inventors: Peter Noble Hudson, Preston (GB); Rania Hamdi Eissa, Preston (GB); Monadl Abd Al-Abbas Mansour Al-Ameri, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/747,662

(22) PCT Filed: Aug. 10, 2016

(86) PCT No.: PCT/GB2016/052481
§ 371 (c)(1),
(2) Date: Jan. 25, 2018

(87) PCT Pub. No.: WO2017/025742
PCT Pub. Date: Feb. 16, 2017

(65) Prior Publication Data
US 2018/0220381 A1    Aug. 2, 2018

(30) Foreign Application Priority Data

Aug. 13, 2015 (GB) .................................. 1514460.3
Sep. 7, 2015 (EP) .................................... 15184038

(51) Int. Cl.
*H03C 1/62* (2006.01)
*H04W 52/28* (2009.01)
*H04B 7/185* (2006.01)

(52) U.S. Cl.
CPC ...... *H04W 52/283* (2013.01); *H04B 7/18506* (2013.01)

(58) Field of Classification Search
USPC ............................. 455/115.3, 127.3, 98, 99
See application file for complete search history.

(56) References Cited

U.S. PATENT DOCUMENTS

| 2,062,003 A | 11/1936 | Hammond, Jr. |
| 4,100,472 A | 7/1978 | Mobley |
| (Continued) | | |

FOREIGN PATENT DOCUMENTS

| EP | 0481171 A2 | 4/1992 |
| EP | 0532383 A1 | 3/1993 |
| (Continued) | | |

OTHER PUBLICATIONS

International Preliminary Report on Patentability of International Application No. PCT/GB2016/052379, md dated Feb. 22, 2018, 7 pages.
(Continued)

*Primary Examiner* — Tu X Nguyen
(74) *Attorney, Agent, or Firm* — Maine Cernota & Rardin

(57) ABSTRACT

An emissions management module for a mission management system of a moving platform, said emissions management module being configured to: —obtain attribute data representative of (i) prevailing emissions control parameters in the form of an emissions control region defined by the relative locations of said platform and another node; and (ii) a direction of said emissions control region with respect to said platform; —generate, using said attribute data, an emissions plan that complies with restrictions defined by said emissions control parameters, and includes at least an emissions limit defining: a) a maximum transmission power permitted to be utilised by an on-board antenna or portion of aperture antenna in a specified direction relative to said moving platform; and/or b) permissible antenna waveforms and/or a specified maximum emissions duration in said specified direction relative to said moving platform; and/or c) permitted or restricted usage of on-board sensors in a specified direction relative to said moving platform.

15 Claims, 12 Drawing Sheets

(56) References Cited

U.S. PATENT DOCUMENTS

| | | |
|---|---|---|
| 6,026,097 A | 2/2000 | Voois |
| 6,115,580 A | 9/2000 | Chuprun et al. |
| 7,072,977 B1 | 7/2006 | Bernard et al. |
| 7,151,749 B2 | 12/2006 | Vega-Garcia |
| 8,005,418 B2 | 8/2011 | Walker |
| 8,554,264 B1 | 10/2013 | Gibbons et al. |
| 2002/0142773 A1 | 10/2002 | Rudrapatna et al. |
| 2002/0164981 A1 | 11/2002 | Parkman |
| 2003/0073406 A1 | 4/2003 | Benjamin |
| 2003/0114195 A1 | 6/2003 | Chitrapu |
| 2005/0202827 A1 | 9/2005 | Demarco et al. |
| 2006/0030350 A1 | 2/2006 | Mitchell |
| 2006/0168592 A1 | 7/2006 | Andrews et al. |
| 2007/0064604 A1 | 3/2007 | Chen |
| 2007/0168090 A1 | 7/2007 | Demarco et al. |
| 2007/0258445 A1 | 11/2007 | Smith |
| 2007/0258486 A1 | 11/2007 | Smith |
| 2007/0291647 A1 | 12/2007 | Smith |
| 2007/0291767 A1 | 12/2007 | Smith |
| 2007/0291768 A1 | 12/2007 | Galliscio |
| 2007/0291780 A1 | 12/2007 | Smith |
| 2007/0297416 A1 | 12/2007 | Boley |
| 2008/0026767 A1* | 1/2008 | Krstulich ............ H04L 63/104 455/452.2 |
| 2008/0204279 A1 | 8/2008 | Bourgault |
| 2009/0079631 A1 | 3/2009 | Hurst |
| 2009/0185617 A1 | 7/2009 | Houghton et al. |
| 2009/0326735 A1 | 12/2009 | Wood |
| 2010/0057278 A1 | 3/2010 | Lee |
| 2010/0094485 A1 | 4/2010 | Verlut et al. |
| 2010/0220648 A1 | 9/2010 | Persson |
| 2010/0278086 A1 | 11/2010 | Pochiraju |
| 2010/0323715 A1 | 12/2010 | Winters |
| 2011/0090835 A1 | 4/2011 | Furukawa |
| 2011/0255506 A1 | 10/2011 | Toth |
| 2012/0078453 A1 | 3/2012 | Daum et al. |
| 2012/0257657 A1 | 10/2012 | Subrahmanya et al. |
| 2012/0268319 A1 | 10/2012 | Mitchell |
| 2013/0041529 A1 | 2/2013 | He |
| 2013/0095822 A1 | 4/2013 | Swardh |
| 2013/0324070 A1 | 12/2013 | Bennett et al. |
| 2014/0014787 A1 | 1/2014 | Chen |
| 2014/0075506 A1 | 3/2014 | Davis |
| 2014/0105054 A1* | 4/2014 | Sægrov ............... H01Q 3/2605 370/252 |
| 2014/0142787 A1 | 5/2014 | Tillotson |
| 2014/0218239 A1 | 8/2014 | Sharawi et al. |
| 2014/0226584 A1 | 8/2014 | Cullen et al. |
| 2014/0274180 A1 | 9/2014 | DuBois |
| 2014/0323038 A1 | 10/2014 | Hubbel et al. |
| 2015/0043337 A1 | 2/2015 | Kanamarlapudi |
| 2015/0102953 A1 | 4/2015 | Stayton |
| 2015/0120087 A1 | 4/2015 | Duan |
| 2015/0131513 A1 | 5/2015 | Lauer |
| 2015/0210387 A1 | 7/2015 | Ling |
| 2015/0229376 A1 | 8/2015 | Kikuchi |
| 2017/0034277 A1 | 2/2017 | Jackson |
| 2017/0283038 A1 | 10/2017 | Lin |

FOREIGN PATENT DOCUMENTS

| | | |
|---|---|---|
| EP | 1519507 A2 | 3/2005 |
| EP | 1630978 A2 | 3/2006 |
| EP | 2228868 A1 | 9/2010 |
| EP | 2378676 A1 | 10/2011 |
| EP | 2450862 A1 | 5/2012 |
| EP | 2469291 A1 | 6/2012 |
| EP | 2779480 A2 | 9/2014 |
| EP | 2822187 A1 | 1/2015 |
| EP | 2869479 A1 | 5/2015 |
| EP | 2933931 A2 | 10/2015 |
| GB | 2493779 A | 2/2013 |
| JP | 2001153596 A | 6/2001 |
| JP | 2010171496 A | 8/2010 |
| TW | 201321916 A | 6/2013 |
| WO | 2006130272 A2 | 12/2006 |
| WO | 2007021411 A2 | 2/2007 |
| WO | 2007110607 A1 | 10/2007 |
| WO | 2010147986 A1 | 12/2010 |
| WO | 2011075869 A1 | 6/2011 |
| WO | 2012145570 A1 | 10/2012 |
| WO | 2015117284 A1 | 8/2015 |

OTHER PUBLICATIONS

International Preliminary Report on Patentability of International Application No. PCT/GB2016/052371, md dated Feb. 22, 2018, 10 pages.
International Preliminary Report on Patentability of International Application No. PCT/GB2016/052374, md dated Feb. 22, 2018, 8 pages.
International Preliminary Report on Patentability of International Application No. PCT/GB2016/052484, dated Feb. 22, 2018, 7 pages.
International Preliminary Report on Patentability of International Application No. PCT/GB2016/052480, dated Feb. 22, 2018, 8 pages.
International Preliminary Report on Patentability of International Application No. PCT/GB2016/052481, dated Feb. 22, 2018, 8 pages.
International Preliminary Report on Patentability of International Application No. PCT/GB2016/052401, dated Feb. 22, 2018, 8 pages.
International Preliminary Report on Patentability of International Application No. PCT/GB2016/052400, dated Feb. 22, 2018, 7 pages.
International Preliminary Report on Patentability of International Application No. PCT/GB2016/052378, dated Feb. 22, 2018, 7 pages.
International Preliminary Report on Patentability of International Application No. PCT/GB2016/052483, dated Feb. 22, 2018, 9 pages.
International Search Report and Written Opinion of International Application No. PCT/GB2016/052371, dated Oct. 26, 2016, 14 pages.
Great Britain Search Report under Section 17 of Great Britain Application No. GB1514451.2, dated Feb. 15, 2016, 3 pages.
Extended European Search Report of European Application No. EP15183514, dated Mar. 2, 2016, 10 pages.
International Search Report and Written Opinion of International Application No. PCT/GB2016/052374, dated Oct. 13, 2016, 12 pages.
Great Britain Search Report under Section 17 of Great Britain Application No. GB1514452, dated Jan. 26, 2016, 4 pages.
Extended European Search Report of European Application No. EP15183519, dated Mar. 3, 2016, 8 pages.
International Search Report and Written Opinion of International Application No. PCT/GB2016/052378 dated Oct. 24, 2016, 11 pages.
Great Britain Search Report under Section 17 of Great Britain Application No. GB1514454.6, dated Jan. 28, 2016, 3 pages.
European Search Report of European Application No. EP15183517, dated Mar. 1, 2016, 8 pages.
International Search Report and Written Opinion of International Application No. PCT/GB2016/052379, dated Oct. 18, 2016, 10 pages.
Great Britain Search Report under Section 17 of Great Britain Application No. GB1514455.3, dated Mar. 18, 2016, 4 pages.
European Search Report of European Application No. EP15183723, dated Mar. 3, 2016, 6 pages.
International Search Report and Written Opinion of International Application No. PCT/GB2016/052400, dated Oct. 18, 2016, 12 pages.
Great Britain Search Report under Section 17 of Great Britain Application No. GB1514457.9, dated Mar. 18, 2016, 3 page.
European Search Report of European Application No. EP15183720, dated Mar. 4, 2016, 8 pages.

(56) References Cited

OTHER PUBLICATIONS

Chen-Mou Cheng et al: "Transmit Antenna Selection Based on Link-layer Channel Probing", World of Wireless, Mobile and Multimedia Networks, 2007. WOWMUM 2007. IEEE International Symposium on A, IEEE, PI, Jun. 1, 2001, pp. 1-6 XP031149144.
International Search Report and Written Opinion of International Application No. PCT/GB2016/052401, dated Oct. 14, 2016, 12 pages.
Great Britain Search Report under Section 17 of Great Britain Application No. GB1514459.5, dated Jan. 28, 2016, 4 pages.
European Search Report of European Application No. EP15183731, dated Mar. 9, 2016, 8 pages.
International Search Report and Written Opinion of International Application No. PCT/GB2016/052481, dated Nov. 2, 2016, 12 pages.
Great Britain Search Report under Section 17 of Great Britain Application No. GB1514460.3, dated Jan. 27, 2016, 3 pages.
Great Britain Search Report under Section 17 of Great Britain Application No. GB1613746.5, dated Jan. 30, 2017, 5 pages.
European Search Report of European Application No. EP15184038, dated Mar. 2, 2016, 9 pages.
International Search Report and Written Opinion of International Application No. PCT/GB2016/052483, dated Oct. 28, 2016, 13 pages.
Great Britain Search Report under Section 17 of Great Britain Application No. GB1514461.1, dated Jan. 29, 2016, 3 pages.
Great Britain Search Report under Section 17 of Great Britain Application No. GB1613747.3, dated Jan. 6, 2017, 5 pages.
European Search Report of European Application No. EP15184043, dated Mar. 7, 2016, 10 pages.
International Search Report and Written Opinion of International Application No. PCT/GB2016/052480, dated Oct. 28, 2016, 12 pages.
Great Britain Search Report under Section 17 of Great Britain Application No. GB1514462.9, dated Mar. 18, 2016, 3 pages.
European Search Report of European Application No. EP15184044, dated Mar. 10, 2016, 8 pages.
International Search Report and Written Opinion of International Application No. PCT/GB2016/052484, dated Oct. 18, 2016, 12 pages.
Great Britain Search Report under Section 17 of Great Britain Application No. GB1514465.2, dated Mar. 17, 2016, 3 pages.
European Search Report of European Application No. EP15184074, dated Mar. 4, 2016, 8 pages.

\* cited by examiner

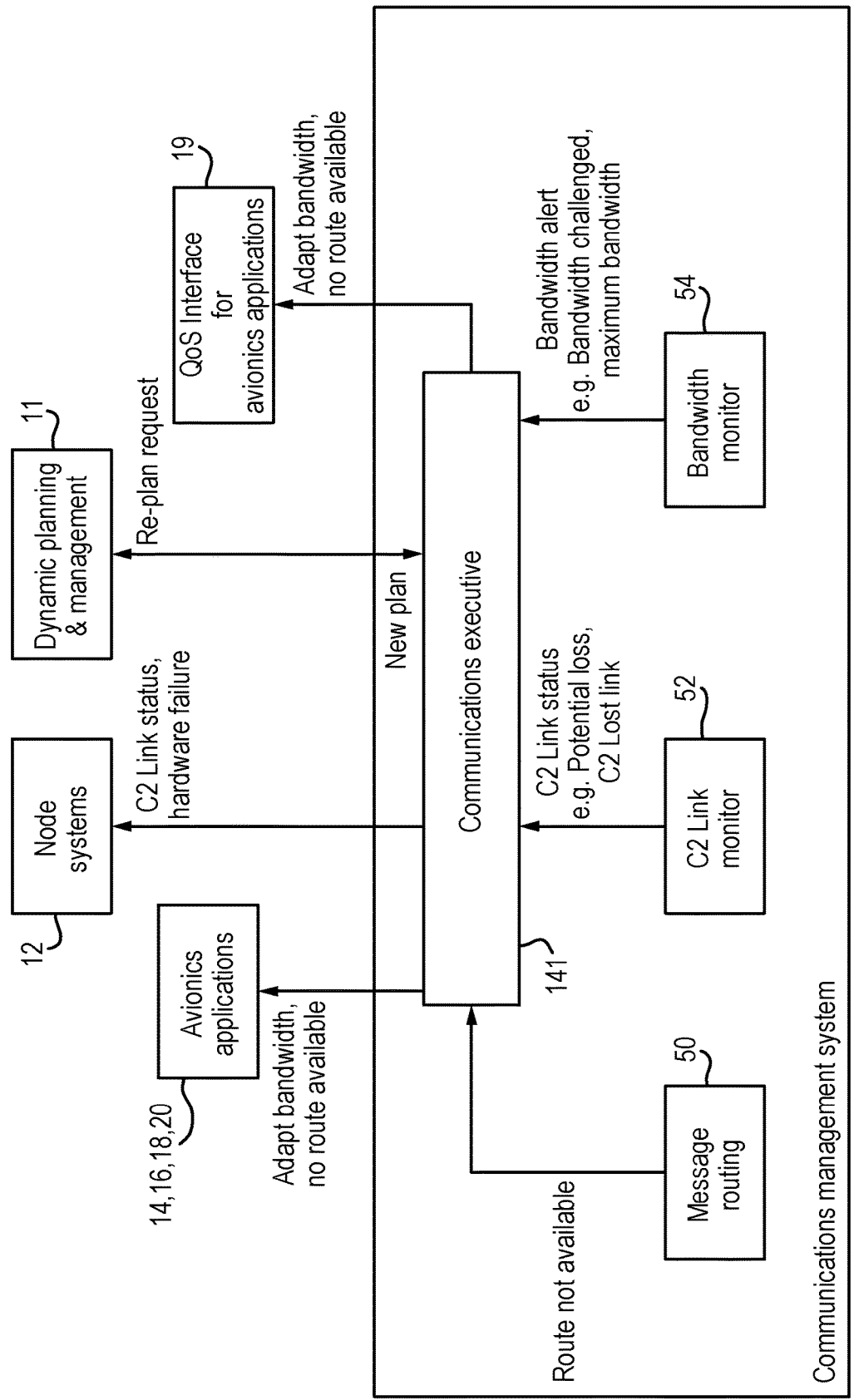

APPARATUS AND METHOD FOR COMMUNICATIONS MANAGEMENT

RELATED APPLICATIONS

This application is a national phase application filed under 35 USC § 371 of PCT Application No. PCT/GB2016/052481 with an International filing date of Aug. 10, 2016 which claims priority of GB Patent Application 1514460.3 filed Aug. 13, 2015 and EP Patent Application 15184038.6 filed Sep. 7, 2015. Each of these applications is herein incorporated by reference in its entirety for all purposes.

This invention relates generally to an apparatus and method for communications and information management and, more particularly, but not necessarily exclusively, to an apparatus and method for management of wireless communications resources between a node on a moving platform and at least one remote recipient.

There are many applications in which it is required to apply a level of management in respect of wireless communications and the management of information, particularly between nodes of a moving platform and one or more remote recipient(s), and maintain adequate wireless communications therebetween for safe operation of the moving platform and mission success.

For example, in the case of aerial vehicles and, more particularly, unmanned aerial vehicles (UAVs), there is an ongoing and stringent requirement to maintain an adequate communications link between the aerial vehicle and a ground station, for example, and unexpected loss or degradation of such a communication link, can be catastrophic.

A UAS is composed of three main parts, the unmanned air vehicle (UAV), unmanned control station (UCS) and support systems of the UAS (for pre-mission planning). A UAS Mission System may be composed of the following functional components/subsystems: Mission Management, Communications, Vehicle Health, Navigation System, Airspace Integration, and Power Management. Multiple, different dynamic in-mission planners may reside in one or more of the above-mentioned functional components/subsystems. In a typical UAV, a dynamic route planner generates a new route, in real time, when there is a change in the operational environment, e.g. severe weather, threat, or a change of circumstances, e.g. an emergency, or a dynamic manoeuvre plan is generated to avoid an airborne obstacle. The aim is thus to maintain safety and the survivability of the aircraft by determining a feasible route and/or manoeuvre in real time, while avoiding pop-up, static and dynamic obstacles, for example.

However, the operational environment of moving platforms, at least in some applications, can be particularly challenging from a communications perspective. In some applications, EMCON or 'emissions control' strategies are used to prevent detection, identification and location of a moving platform, and/or minimise interference among other nodes in the operational environment or other platform systems. Platforms may betray their existence by emitting energy that can be intercepted by adversary surveillance systems, such as electronic support measures (ESM) and electronics intelligence (ELINT) receivers, thereby increasing their vulnerability. Application of EMCON conditions during a mission may be incorporated into the planning phase, for example, to take into account the entry of an aircraft into restricted air space. However, in many cases, EMCON conditions may be applied dynamically, due to an unexpected event, such as the detection of a static or dynamic threat during mission execution.

An on-board antenna for transmitting messages may be oriented in an unfavourable direction relative to an imposed emissions control (EMCON) region or with respect to an adversary. Also, the energy radiated in that direction may exceed an acceptable threshold for emissions control, increasing the vulnerability of the node and possibly betraying its existence. Traditionally a platform is required to operate in complete radio silence, in order to avoid being detected. However, if the communications system was able to adapt and respond accordingly, such that its emissions adheres to the imposed EMCON, for example by adapting the transmission power of the communications link and/or using a covert antenna, it may still be possible to maintain communications. It would therefore be desirable to provide an intelligent communications management system for a moving platform that is able to adapt and respond dynamically to the presence of an uncertain dynamic battlefield environment, such as threats, by managing their communications resources accordingly.

Multiple communications links and/or aircraft systems, such as sensors and navigation system, are co-located on the same platform. Simultaneous operation of the above may lead to significant signal degradation due to interference. Typically, co-existence issues are resolved at the design stage, in order to mitigate interference. However, when dynamically adapting the transmission power, for example, the co-existence of others on the same platform may be compromised. Mitigating interference among other platforms sharing the same operational space also needs to be considered. It would also be desirable to provide an intelligent communications management system that is able to manage its emissions, without potentially interfering with other systems, by managing its communications resources accordingly.

In accordance with an aspect of the present invention, there is provided an emissions management module for a mission management system of a moving platform, said emissions management module being configured to:

obtain attribute data representative of (i) prevailing emissions control parameters in the form of an emissions control region defined by the relative locations of said platform and another node; and (ii) a direction of said emissions control region with respect to said platform;

generate, using said attribute data, an emissions plan that complies with restrictions defined by said emissions control parameters, and includes at least an emissions limit defining:

a) a maximum transmission power permitted to be utilised by an on-board antenna or portion of aperture antenna in a specified direction relative to said moving platform; and/or b) permissible antenna waveforms and/or a specified maximum emissions duration in said specified direction relative to said moving platform; and/or c) permitted or restricted usage of on-board sensors in a specified direction relative to said moving platform.

In an exemplary embodiment, the data representative of prevailing emissions control parameters may comprise location data representative of a specified emissions control region and/or location data representative of an adversary node defining an emissions control region.

The emissions plan may further include data representative of permissible antenna waveforms and or a specified maximum emissions duration in said specified direction relative to said moving platform.

The emissions management module may, optionally, be configured to generate a plurality of emissions plans relating to a respective plurality of specified directions relative to said moving platform. The emissions management module may, optionally, be configured to generate at least one emissions plan in respect of a planned or predicted route of said moving platform; and/or to generate a plurality of emissions plans in respect of a respective plurality of portions of a planned or predicted route of said moving platform.

Optionally, the emissions management module may be configured to generate an updated emissions plan in response to an unplanned event. Such an unplanned event comprises one or more of the detection of a pop-up threat, a route change of said moving platform, and a change of platform mode of operation.

In an exemplary embodiment, the attribute data may comprise data representative of a location of a threat relative to said moving platform and/or another node, an emissions control level associated with said threat and threat profile information.

In accordance with another aspect of the present invention, there is provided apparatus for communications management in respect of a moving platform comprising at least one platform application and a communications system, said communications system being arranged and configured to effect data communication between said platform and another node by means of a supported wireless communications link in accordance with a communications plan, wherein said apparatus comprises an emissions management module substantially as described above.

In an exemplary embodiment, the apparatus may be configured to: receive data representative of a communications requirement between said platform and another node; and generate said emissions plan for use in generating a communications plan for supporting said communication requirement between said platform and said other node.

Optionally, the apparatus may comprise a communications planning module, wherein said emissions management module is configured to:
  generate emissions plan data representative of said emissions plan and transmit said emissions plan data to said communications planning module;
  said communications planning module being configured to:
  in response to receipt of said emissions plan data, determine, which of a plurality of available on-board antennas is permissible for use to comply with said restrictions defined by said emissions plan; and
  select a permissible antenna and include data representative of said permissible antenna in a communications plan.

The above-mentioned communications planning module may be configured, in generating said communications plan, to perform a power selection process for selecting a transmission power of one or more antennas designated in said communications plan to comply with said emissions limit defined in said emissions plan.

Optionally, the communications planning module may be configured to determine a best achievable transmission power to achieve a desired wireless link quality, using data representative of one or more of: relative distance between said platform and a recipient node, relative distance between said platform and said EMCON region/adversary node, communications link power range, platform power budget, antenna gain and/or antenna pointing, losses (e.g. atmospheric loss, free-space propagation loss), and communications requirements of said at least one platform application.

In an exemplary embodiment, the apparatus may further comprise a platform geometry engine module for providing to said emissions management module data representative of a position and/or orientation of said platform relative to said other node and/or said other node relative to said moving platform. The apparatus may comprise a platform geometry engine module for providing to said emissions management module data representative of said direction of said emissions control region with respect to said platform.

In accordance with yet another aspect of the present invention, there is provided a method for emissions management in respect of a moving platform, comprising:
  obtaining attribute data representative of (i) prevailing emissions control parameters in the form of an emissions control region defined by the relative locations of said platform and said other node; and (ii) a direction of said emissions control region with respect to said platform;
  generating, using said attribute data, an emissions plan that complies with restrictions defined by said emissions control parameters, and includes at least an emissions limit defining:
    a) a maximum transmission power permitted to be utilised by an on-board antenna or portion of aperture antenna in a specified direction relative to said moving platform; and/or
    b) permitted or restricted usage of on-board sensors in a specified direction relative to said moving platform.

These and other aspects of the present invention will be apparent from the following specific description, in which embodiments of the present invention are described, by way of examples only, and with reference to the accompanying drawings, in which:

FIG. 4 is a schematic block diagram illustrating a communications executive function according to an exemplary embodiment of the present invention;

Figure 1:
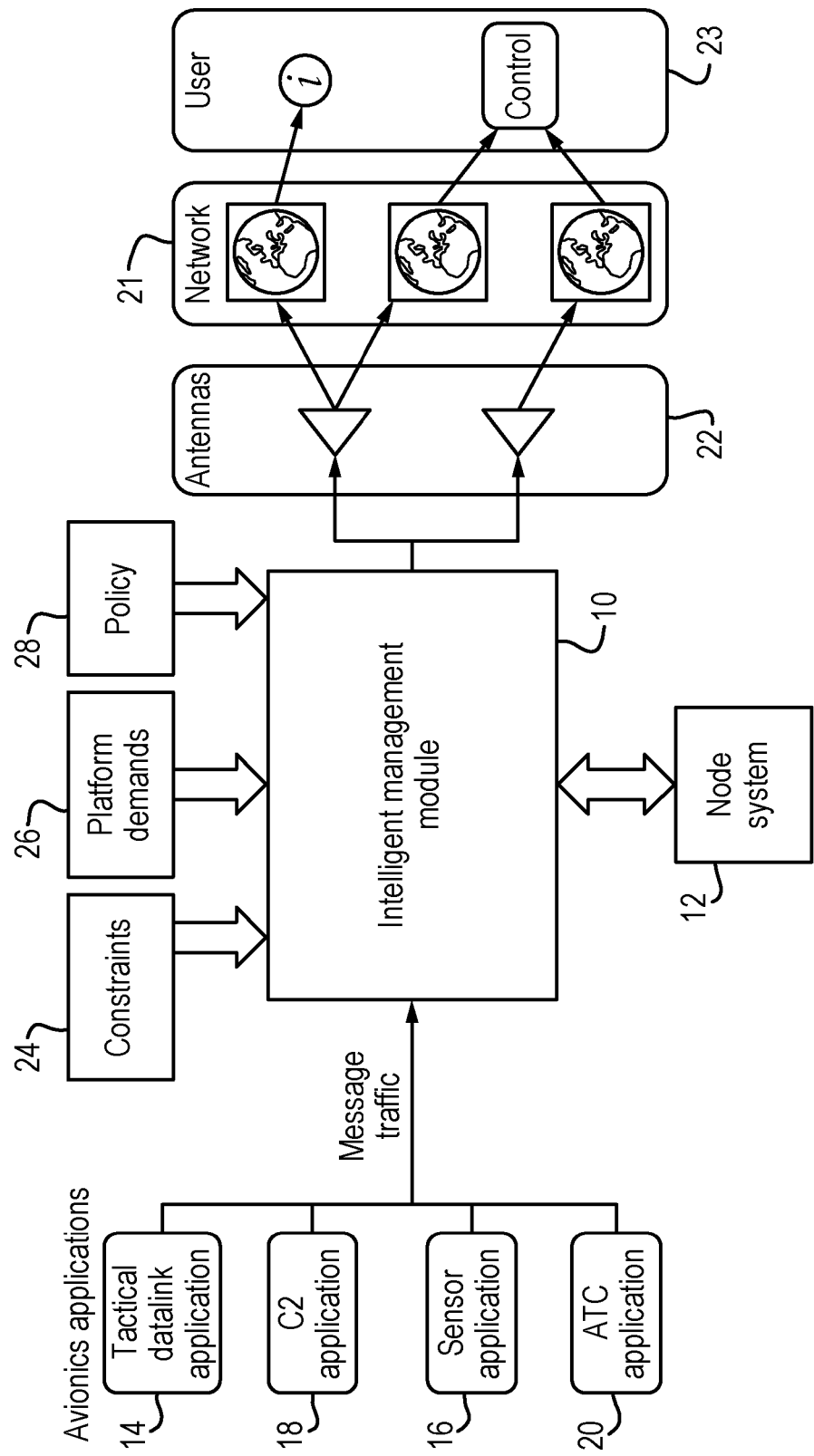
FIG. 1 is a schematic block diagram illustrating a moving platform management system, including apparatus according to an exemplary embodiment of the present invention.

Communications management during restrictive control of emissions is performed, in accordance with exemplary embodiments of the present invention, using various approaches which may include one or more of antenna selection, link selection, power control and node manoeuvre. For example, during restricted emissions, it may be desirable (or indeed critical) to maintain contact between one node and at least one fixed or mobile node while operating. It will be apparent to a person skilled in the art that antennas are normally securely mounted to an aircraft, or other moving platform, and are not generally moveable relative thereto. An antenna on a platform, used for transmitting messages from the source node to the recipient node, may be pointed in an unfavourable direction with respect to an imposed EMCON region and the energy radiated in that direction may exceed an acceptable threshold for emissions control, thus increasing the vulnerability of the node and betraying its existence. Thus, emission management in accordance with an exemplary embodiment of the present invention is configured to dynamically plan by, for example, selecting suitable antenna(s) and/or communications links, and/or adjust the off-board transmission power to an acceptable level so as to maintain the required communications without being detectable or interceptable. In some exemplary embodiment, a node manoeuvre request may, additionally or alternatively, be generated, with a view to maneuvering the node to orient the transmitting antenna optimally for maintaining the required communications, without violating EMCON restrictions.

Exemplary embodiments of the present invention provide an intelligent communications planning module for an intelligent communications management system of a moving platform, so as to manage its emissions in response to dynamic emissions control.

Traditionally, all aspects of communications, such as multiple, different communications links/radios, reside within the communications system. Each of the communications links/radios is an independent system and usually dedicated to transmitting specific messages. If, for example, an unexpected event occurs, such as a link failure or degradation, change in mission priorities and new operational constraints, the system is unable to adapt and respond accordingly to maintain adequate communications. The communications system is usually a dedicated system without much interaction, if any, with other platform systems and avionics applications on the platform. Furthermore, in some cases, a higher-level planner is required, which resides outside the communications system, to meet the changing demands of the platform and new operational constraints. In contrast, in aspects of the present invention, it is recognised that all functions/systems on a platform (e.g. mission management, communications, airspace integration, and vehicle health management) work in concert to achieve mission objectives and to maintain integrity of the platform. For example, the communications system may inform the platform health management system when a lost link situation arises to ensure that communications failure will not lead to a catastrophe. Thus, and as will be described in more detail later, the communications system is concerned with low-level decision making, i.e. day-to-day running and decisions. However, if it is unable to resolve a communications issue, for example, all available links to it have failed or severely degraded links, then higher-level planning is invoked. Furthermore, when dynamic emissions control is imposed, higher-level decision making is responsible for protecting the aircraft from being detected, via apparatus according to exemplary embodiments of the present invention. In this case, the dynamic planning and management system generates a modified plan in order to respond to new operational constraints.

The operational environment of a moving platform, in many different applications, comprises a plurality of nodes (e.g. fixed/mobile control station, manned and/or unmanned air vehicles) interacting with each other via different networks, exchanging, for example, Command and Control (C2), maintaining situational/environmental awareness, and cooperatively working together. In general, a node has multiple communications links/radios to enable it to interact with other nodes via different networks, as required.

In the following description of the drawings, a communications management apparatus according to an exemplary embodiment of the invention will be described in relation to a UAV system. However, it is to be understood that the present invention is not necessarily intended to be limited in this regard and, indeed, finds application in many other types of mobile vehicle and fixed infrastructure systems in which it is required to manage communications in an intelligent manner and, for the avoidance of doubt, this would include manned and unmanned road and sea-going vehicles, ground- and airborne-control based infrastructure, as well as manned aerial vehicles.

Referring to FIG. 1 of the drawings, an intelligent management module 10, including apparatus according to an exemplary embodiment of an aspect of the present invention, is illustrated schematically at the centre of a typical UAV system. The UAV system comprises a plurality of nodes, wherein each node may comprise several functional components/systems/subsystems, including communications, flight system, prognostics and health, etc. Thus, in the schematic diagram of FIG. 1, the intelligent communications management module 10 is incorporated in a first node and depicted as being communicably coupled to other parts 12 of the vehicle. It can be seen from the diagram that two-way data communication is provided between the rest of the vehicle 12 and the intelligent management module 10. It can be seen from the diagram that two-way data communication is provided between the node system 12 and the intelligent management module 10. The node system 12 may comprise a plurality of functional components/systems/subsystems, possibly including, but not necessarily limited to, a prognostics and health functional component, a navigation system, a control authority, e.g. pilot or an on-board authority with executive decision functionality, a utilities management functional component, defensive aids functional component, data transfer and recording functional component, and an HMI (Human Machine Interface) functional component. Any and all of these functional components are configured to provide information, such as navigation data and detected threat, to the intelligent communications management module 10 for use in its decision making.

The intelligent communications management module 10 is also configured to receive data from a plurality of avionics applications. Such avionics applications may, for example, comprise civil and/or military applications, such as tactical datalink applications 14, sensor applications 16 (e.g. video, images), mission management applications 18 (for example, command and control data), and platform management applications 20 (e.g. health of node). It will be appreciated that this is not a comprehensive list of typical or possible applications from which the intelligent communications management system may receive data and others will be apparent to a person skilled in the art, depending upon the specific application within which the present invention is to be employed.

The intelligent communications management module 10 is configured to manage multiple communications links (generally depicted in FIG. 1 as 'network' 21), which may include (but are not limited to) tactical data links, satellite links, free space optical links and other data links, as will be apparent to a person skilled in the art, and it may have different antenna types (depicted generally at 22) to manage, including but not limited to, omni-directional and directional antennas, fixed or beam-steerable antennas. The antennas may be shared between links/radios, or with sensor systems. In the example illustrated in FIG. 1, the communications from the platform antennas 22 are directed at an end user 23, for example, the remote pilot of a UAV located at a ground station. However, communications are not necessarily intended to be in any way limited in this regard.

Thus, the Intelligent Communications Management System has access to a wealth of information, such as mission environment and internal state of the node, and uses this information in its decision making. The environment represents the systems knowledge about the outside world, including network and link performance, other nodes in the network environment, dynamic threats, terrain, obstacles and weather data. The internal state is a representation of the internals of the system. It collects internal data from contributing sub-systems, such as real-time node attitude and position, current operational mode and applications' communications requirements, and it retains communications/information exchange plans, policies and information about installed resources (e.g. communications links, antennas).

A database (not shown) provides the intelligent communications management module 10 with knowledge about its mission environment and internal state, and uses this information in its decision making. The environmental data represents the system's knowledge about the outside world, including network and link performance, other nodes in the network environment, dynamic threats, terrain, obstacles and weather data. The internal state is a representation of the internal sub-systems of the system. The database collects internal data from contributing sub-systems, such as real-time node attitude and position, current operational mode and the communications requirements of individual applications, and it retains communications/information exchange plans, policies and information about installed resources (e.g. communication systems, antennas). For example, the antenna gain patterns for each installed antenna on a node would be stored on each node, in a database for example, to be used by the intelligent communications management module 10 in respect of, for example, antenna selection. In this example, the antenna gain patterns are mapped with respect to the body reference frame of the node, i.e. location of the antenna on the node.

It will be appreciated that the term "database" used above, is used simply to define one or more repositories for the required data. In one exemplary embodiment, the database may be a single repository, provided on the intelligent management module 10 (or at least dedicated thereto) in which all of the aforementioned data is stored for use thereby. In other exemplary embodiments, such a single repository may be used to store only a sub-set of the data, such as policies and installed antenna performance, to be accessed as required, with data that changes dynamically during a flight or mission, such as node position and operational mode, being sent directly from a relevant part of the overall platform management system to the intelligent communications management module.

Also illustrated in FIG. 1, are data inputs representative of constraints 24, platform demands, and policy 28. These factors and the manner in which data representative thereof can be obtained will be known to a person skilled in the art. The policy 28, for example, may be designed by the network designer. A copy of this policy may reside within the intelligent management module 10, or accessible thereby. The policy contains a set of rules that, for example, define how communications links and antennas can be used, what action to take in the event of a hardware fault and/or loss of signal, and how avionics applications can be served to support the mission. Such rules may be expressed as condition-action pairs (i.e. IF condition THEN action) and/or in look-up tables.

Figure 2:
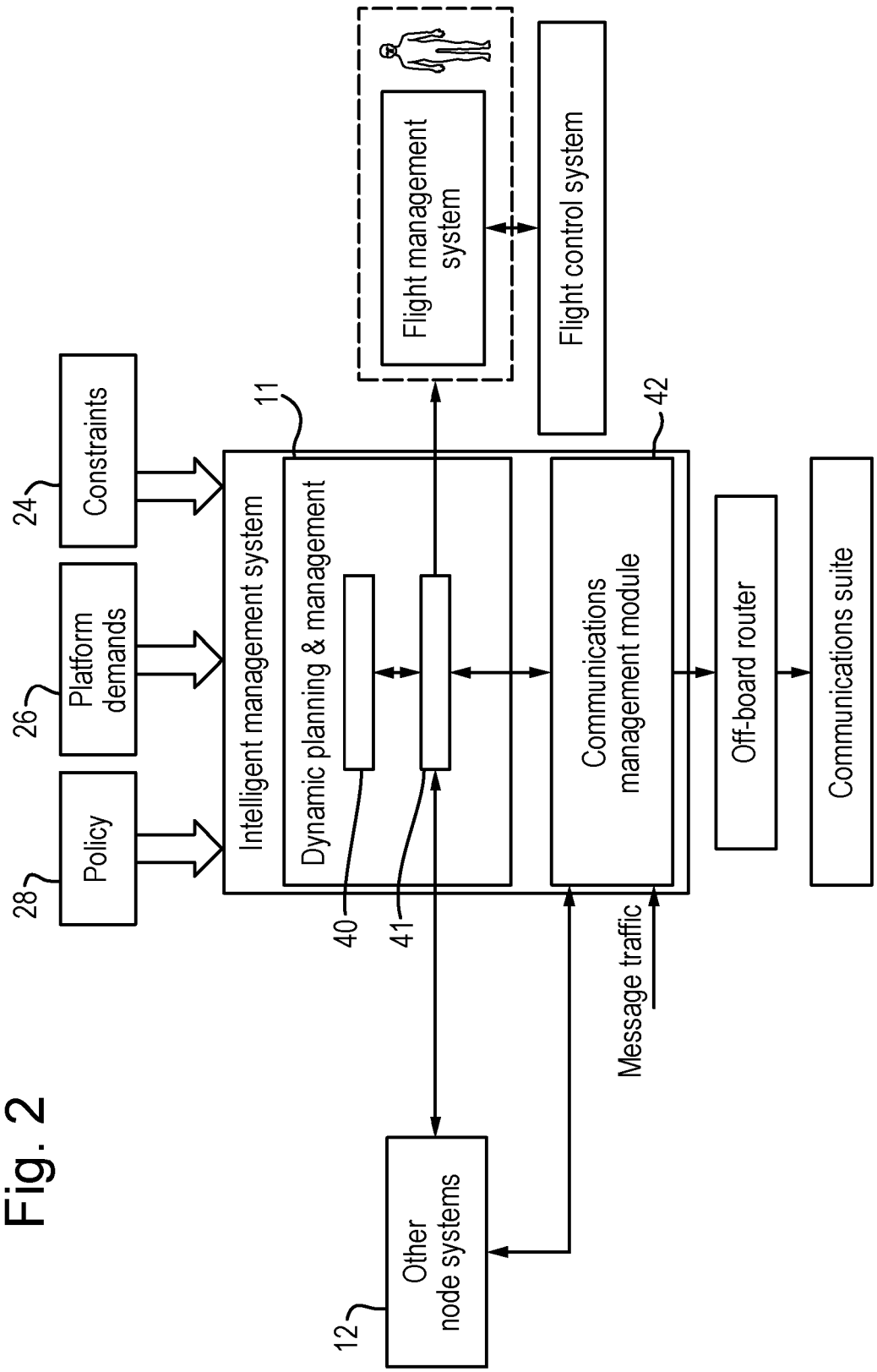
FIG. 2 is a schematic block diagram illustrating some principal features of the moving platform management system of FIG. 1 in more detail.
Figure 3A:
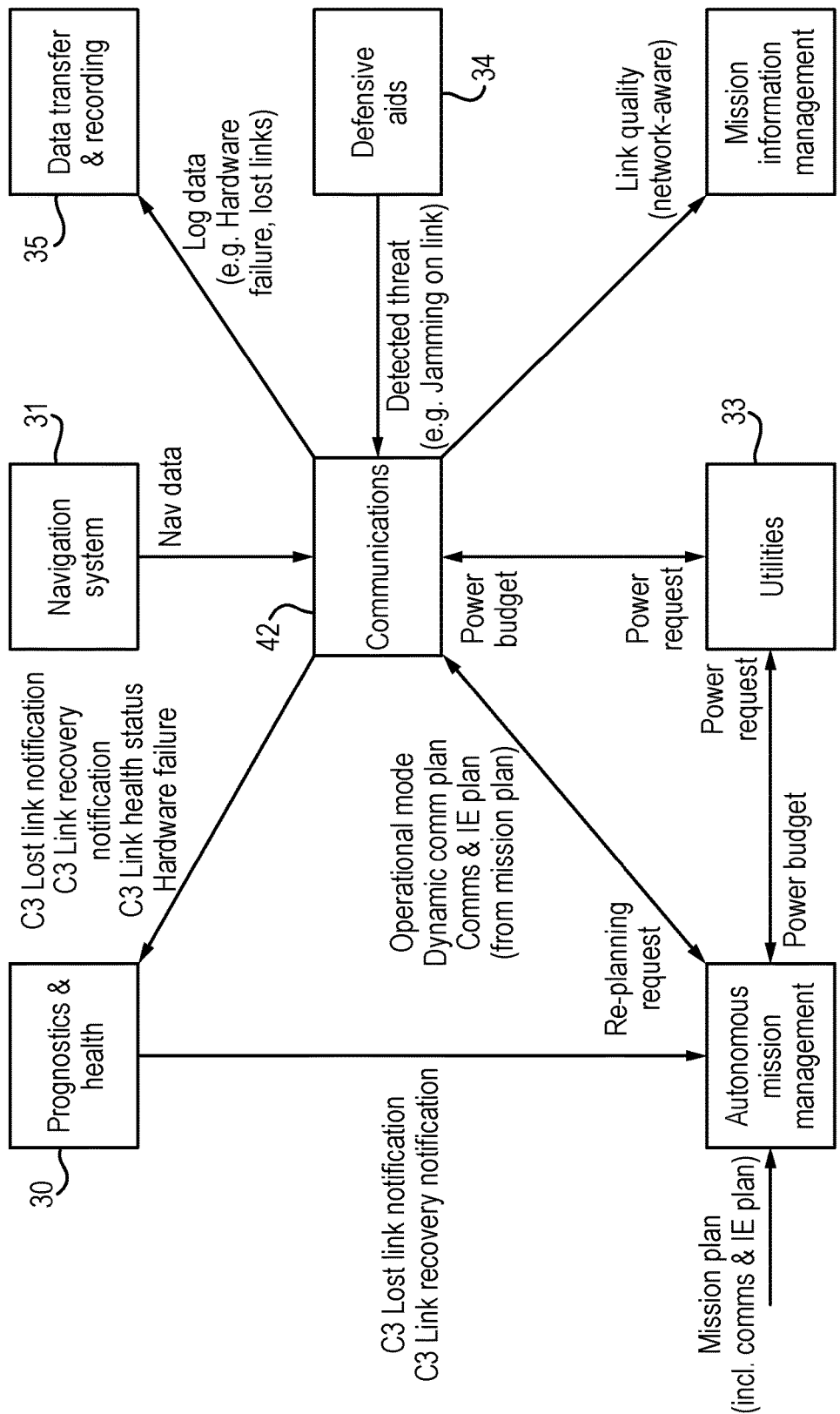
FIG. 3A is a schematic block diagram illustrating the data connections of an intelligent communication management system, including apparatus according to an exemplary embodiment of the present invention, in an air-based system.
Figure 3B:
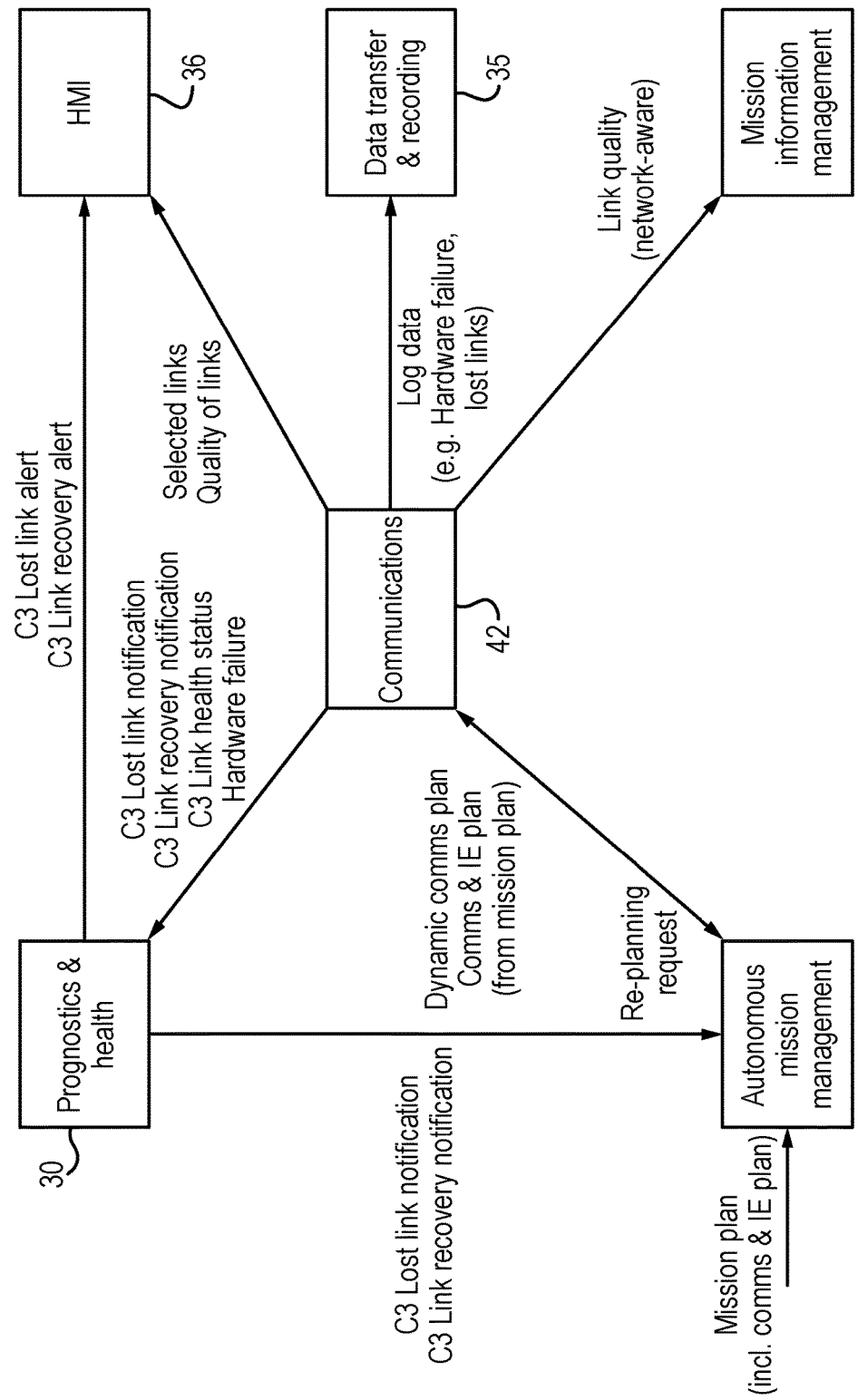
FIG. 3B is a schematic block diagram illustrating the data connections of an intelligent communication management system, including apparatus according to an exemplary embodiment of the present invention, in a ground-based system/airborne control station.

Thus, the Intelligent Communications Management System can be divided into two distinct parts with inputs and outputs to each other and other parts of the aircraft or ground-based system, as shown in FIG. 2. These parts may reside in different systems/subsystems of the aircraft or ground-based system, as shown in FIGS. 3A and 3B. Such an implementation is more applicable to Unmanned Air Systems (UAS). In another implementation, the different functions may reside in one box; this implementation may be appropriate for manned systems, such as a manned air vehicle.

As explained above, EMCON or 'emission control' policies and strategies are used to prevent detection, identification and location of a moving platform, and/or minimise interference among the node systems of the moving platform. Whilst EMCON conditions (and, therefore policies and strategies for implementing them) vary, according to the application as well as particular circumstances, the underlying principles of EMCON will be well known to a person skilled in the art. Setting EMCON requires four basic steps: criteria, objectives, notification and authority. The criteria specify the overarching planning, procedure and responsibility for EMCON policy or strategy. The objectives, as will be apparent, define the desired result of the EMCON policy or strategy and may include, for example, minimising detection by third party sensors, allowing effective command and control (C2) communications between nodes, supporting operational deception (OPDEC), supporting operations security (OPSEC), minimising interference among nodes, and degrading effectiveness of third party C2 communications. It is these objectives that may be used by a communications planning module according to an exemplary embodiment of the present invention (in addition to node position/orientation and antenna type) to determine the suitability of an antenna for a particular information exchange when EMCON restrictions prevail, and/or determine an optimal off-board transmission power that can be used for a selected antenna to support that information exchange.

For completeness, the notification criterion specifies the parties to be notified of the EMCON policy or strategy, and the manner in which the criteria will be notified and monitored. Finally, authority defines the party or parties authorised to impose an EMCON condition in any particular case.

Referring now to FIG. 2 of the drawings, the intelligent management module 10 comprises a dynamic planning and management module 11 and a communications management system 42. The communications management system 42 is concerned with low-level decision making, whilst a dynamic planning and management module 11 is concerned with higher-level decision making. When dynamic emissions control is imposed, higher-level decision making is responsible for protecting the aircraft from being detected; emission management resides within the "higher-level" planning/management, such as 32 in FIGS. 3A and 3B. Dynamic Emission planning may be invoked upon receiving information about a threat from an external node (directly or indirectly via the aircraft's mission management function) or upon receiving information from its own on-board detection systems, such as ELINT receivers. The dynamic emissions planner generates an emissions plan taking into account, node position/orientation, route and trajectory, location of threat and prevailing EMCON policy or strategy with respect to those conditions, for example. An emissions plan in this context may, for example, consist of data representative of a selected antenna together with power control data configured to control the power emissions from the selected antenna, to maintain communications without violating emissions control. In an alternative exemplary embodiment, the emissions plan may be accompanied by another plan to maintain communications, whilst adhering to EMCON. For example, the emissions plan may consist of data representative of a selected antenna, and the other is that for a node manoeuvre plan to meet platform demands without violating emissions control.

As in exemplary embodiments of the present invention (and as illustrated in FIGS. 2, 3A and 3B of the drawings), the intelligent communications management system 10 works cooperatively with the rest of the platform's systems/subsystems to achieve the mission goal: to provide information for situational awareness and safety purposes, and to receive information used in its decision making. In other words, at least parts of the node system 12 are communicably coupled to the communications management system 42 and the dynamic planning and management module 11. The communications module 42 is configured to monitor and evaluate current network performance, so it is network-aware, and provision is made in exemplary embodiments of the invention to use such network-awareness to enable platform applications (or a QoS interface associated therewith) to dynamically adapt and respond to varying available bandwidth of a communications link being used thereby.

As in exemplary embodiments of the present invention (and as illustrated in FIGS. 2, 3A and 3B of the drawings), the intelligent communications management system 10 works cooperatively with the rest of the platform's systems/subsystems to achieve the mission goal: to provide information for situational awareness and safety purposes, and to receive information used in its decision making. In other words, at least parts of the node system 12 are communicably coupled to the communications management system 42 and the dynamic planning and management module 11.

FIGS. 3A and 3B depict schematically this interaction for air-based systems and ground-based systems/airborne control station respectively. As explained above, the node system 12 may comprise one or more of a prognostics and health system 30, a navigation system 31, a control authority 32, e.g. pilot node or an on-board authority with executive decision functionality, a utilities management system 33, defensive aids system 34, data transfer and recording 35 system, and an HMI (Human Machine Interface) 36. As an example, the Health function within the UAV Communications function provides C2 health status updates to the node's Prognostics and Health function. If a C2 Lost Link is detected by the intelligent management system's Health function, it will send a C2 Lost Link alert message to Prognostics and Health system, for it to take the appropriate action; for a UAV, the Prognostics and Health function notifies Airspace Integration and/or Mission Management of the C3 Lost Link, while for a UCS, it reports the C2 Lost Link to the HMI (intended for the pilot).

The intelligent communications management system 10 receives a large quantity of information from different parts of the platform, which it can use in its decision-making processes, as described in more detail below. It is consequently mission-, motion-, and network-aware and understands what resources it has to manage, as well as their performance capability. Mission-awareness provides information on what the platform is trying to achieve. There can be various operational modes, that might include normal operation, reconnaissance, under attack, attack, taxiing, landing, etc. This is common to the entire platform and is of particular concern to the communications module 42. The communications module 42 monitors and evaluates current network performance, so it is network-aware. Network awareness information may also be shared with the dynamic planning and management 11 for planning purposes. Motion-awareness enables communications module 42 to intelligently route information along the best path to ensure connectivity to a fixed and/or mobile node is maintained, for example, in response to an unexpected and possibly a sharp manoeuvre. The dynamic planning and management 11 is also motion-aware, in that it may receive a priori future route and/or manoeuvre plan in order to assess its impact on communications and to select suitable communications link(s), including antennas. The dynamic planning and management 11 is aware of other platform demands, such as emission demands. It is thus, mission-, network-, motion- and platform-aware, enabling the intelligent communications management system 10 to dynamically adapt and respond to unexpected events, e.g. change in mission priorities, mission environment and network conditions.

Referring back to FIG. 2 of the drawings, dynamic planners are also widely known and used in many different applications. A dynamic planner is typically provided in respect of, for example, a UAV for planning its route/path, from a start point (typically, but not always) to a defined end point (and optionally including any defined waypoints therebetween), as well as planning its manoeuvre and/or trajectory. Known dynamic planners (path, manoeuvre and trajectory) tend to base their calculation on several factors, such as terrain, threat, weather, and platform constraints. For example, a manoeuvre may be calculated to avoid an airborne obstacle or a path calculated to avoid detection of the UAV. Other types of dynamic planners for route planning in many different applications will be known to a person skilled in the art and the present invention is not necessarily intended to be limited in this regard. However, in prior art systems, the need to perform dynamic communications planning as part of platform protection to avoid detection, has not been considered, In this exemplary embodiment of the present invention, the management function 41 of the dynamic planning and management module 11 may be configured to interface with the dynamic planner 40, the communications management system 42 (for example, via a communications executive, as will be described in more detail below) and other parts of the node system 12. In this case, the management function 41 may be responsible for generating plan requests and providing attributes to the dynamic planner 40, evaluating new plans, selecting the best plan, requesting authorisation from the platform/pilot to execute the new plan (e.g. use a sensor system for communication purposes, manoeuvre a node), in order to optimise communications.

Referring to FIG. 4 of the drawings, in one exemplary embodiment of the invention, a Communications Executive function 141 is provided within the communications management system 42 to enable it to interface with components internal and external to the communications management system 42. Internal components of the communications management system 42 include a message routing module 50, a C2 (command and control) monitor 52 and a bandwidth monitor 54. The Communications Executive function 141 is configured to manage plan requests, receive new plans, work with avionics applications 14, 16, 18, 20 and/or a QoS interface 19 for avionics applications, receive health reports and report health issues that may have an impact on a mission. In general, if the communications management module 42 cannot adapt to meet current platform demands using integrated low-level planning functionality, then higher-level planning is invoked. For example, if the message routing function 50 determines that there are no available wireless communications links, then higher-level communications planning may be invoked via the Communications Executive function 141. When EMCON restrictions are unexpectedly imposed due to, for example, the detection of a nearby adversary, then higher-level decision maker(s), such as emission management, is thus responsible for protection of the node. Dynamic Emission planning (i.e. higher-level) may be invoked upon receiving information about a threat from an external node (directly or indirectly via the aircraft's mission management function) or upon receiving information from its own on-board detection systems, such as ELINT receivers. As a result, the dynamic emissions planner generates an emissions plan for communication purposes. In one exemplary embodiment, as explained above, the emissions plan may include power control data for controlling the off-board transmission power for a selected antenna; and the emissions plan, thus generated, is transmitted to one or more controllers, for example via the communications executive, for implementation. In another exemplary embodiment, a node manoeuvre may be required in order to correctly orientate an antenna to maintain communications between a node and another node, that do not violate emissions control. In such a case, this may require the dynamic emissions planner to work in concert with the dynamic node manoeuvre planner or the like.

Figure 5:
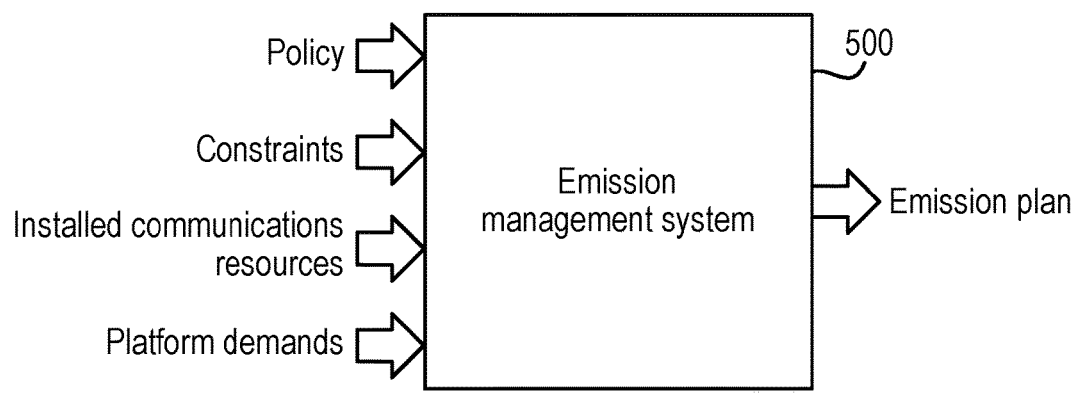
FIG. 5 is a schematic block diagram illustrating an emission management system according to an exemplary embodiment of the present invention.

Referring to FIG. 5 of the drawings, an emission management system 500 for use in apparatus according to an exemplary embodiment of the present invention, is configured to devise an Emissions Plan for communication purposes in response to a dynamic emissions control (EMCON). Emission Management can use various approaches to manage the communications systems emissions, such as antenna selection, power control, or a mixture thereof.

Dynamic emissions planning is based on information it has about installed antennas (antenna mount, type, pointing and performance), installed communications links (e.g. performance), current link performance, applications' communications requirements and the location of a fixed or mobile adversary. The Emissions Plan may be used in conjunction with a node manoeuvre plan. The following is an example where two different planning elements are combined to achieve mission objectives.

Figure 6:
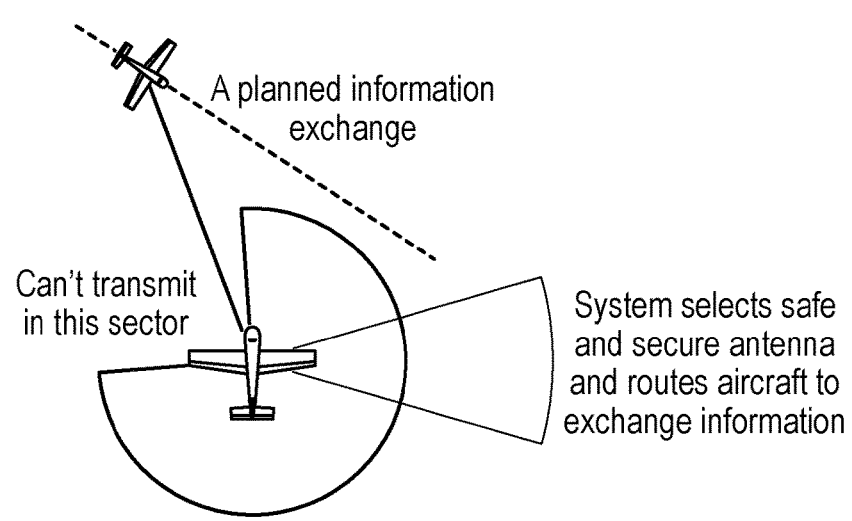
FIG. 6 is a schematic illustration of an aircraft with omni-directional and directional transmission antennas, operating under dynamically imposed EMCON.
Figure 7:
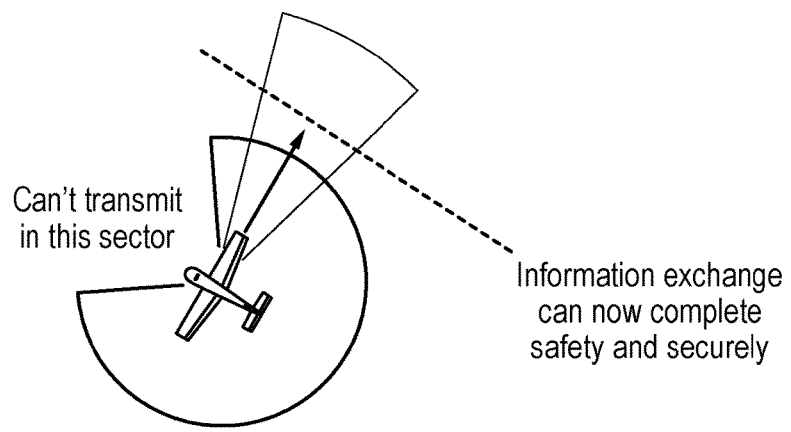
FIG. 7 is a schematic illustration of a method of antenna selection and node manoeuvre according to an exemplary embodiment of the present invention.

FIG. 6 illustrates node A with two antennas with different antenna gain patterns; a directional transmission antenna pattern, which is pointing in the direction of the east, and an omni-directional transmission antenna pattern. On its planned flight path, node A has information to exchange with another node using its omni-directional transmission antenna. During mission execution, emissions control is dynamically imposed in a north-west direction, in the top-left quadrant of FIG. 6. However, the energy which would be radiated from the omni-directional transmission antenna is significant to violate the imposed emissions control. Based on the antenna selection method, the directional antenna is identified as the best antenna to maintain communications whilst adhering to emissions control. However, since the antenna is pointing in the wrong direction with respect to the recipient, a node manoeuvre is required. The planner determines that maneuvering the node by 45 degrees to the left (as shown in FIG. 7) will enable communications, without violating emissions control. So by using the directional antenna and maneuvering the node by 45 degrees, the node will achieve optimal communications whilst adhering to emissions control.

In another example, an aircraft may be using a directional antenna to maintain communications with another aircraft, whilst adhering to prevailing EMCON restrictions. An adversary appears, unexpectedly, in the direction of the recipient node and the emission energy radiated in that direction (by the source node antenna) is determined to exceed a threshold for EMCON, thus increasing the vulnerability of the node. Thus, using apparatus according to an exemplary embodiment of the present invention, the off-board transmission power may be adjusted to an acceptable level, enough to maintain communications with the recipient node, but low enough to be undetectable by an adversary.

Figure 11:
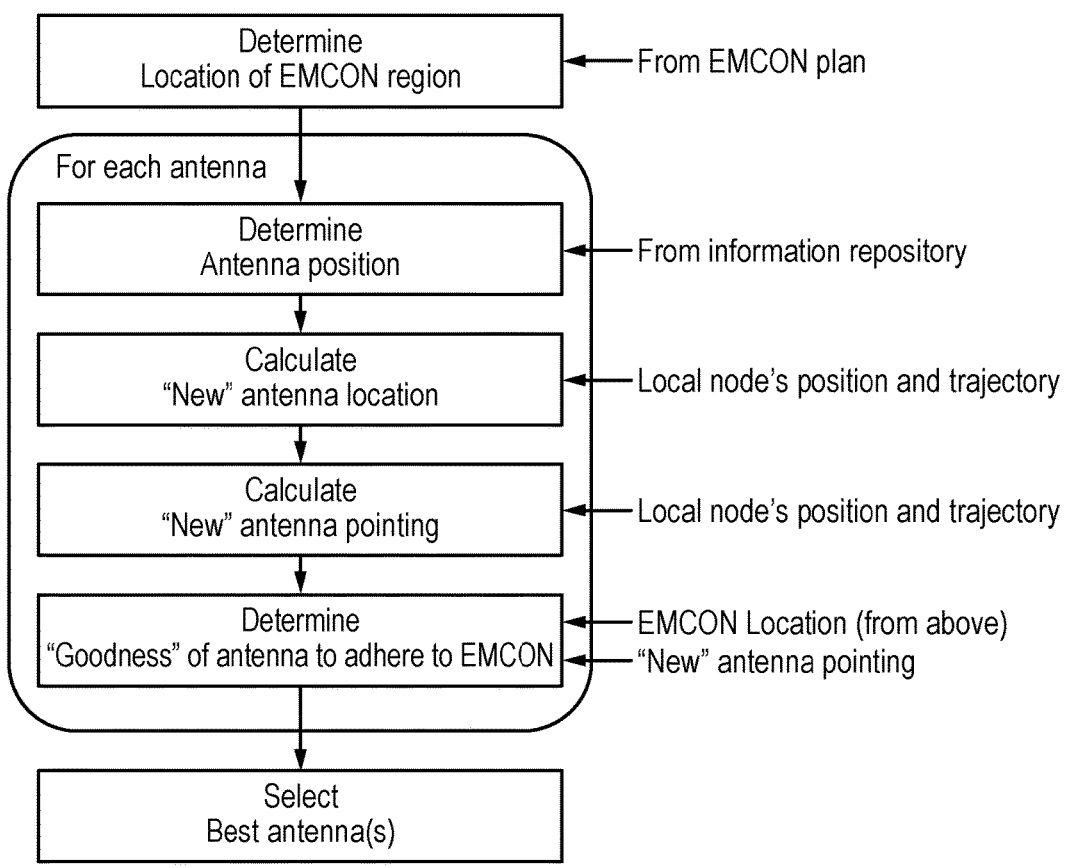
FIG. 11 is a flow chart illustrating the principal steps of an antenna selection method according to an exemplary embodiment of the present invention.

Referring to FIG. 11 of the drawings, a method according to an exemplary embodiment of the present invention begins with determining the location of the emissions control region. This information can be obtained via dynamic in-mission updates, e.g. broadcasted during mission execution, or by accessing a database. The emissions control region can be defined in terms of longitude, latitude, and altitude. In another embodiment, the method determines the location of a known adversary (i.e. someone in the environment we don't want detecting or intercepting communications).

The method proceeds with determining the direction of the EMCON region with respect to the node. In one embodiment, the position of the node is provided by satellite data. The position of the EMCON region is determined in the previous step.

The method proceeds with determining whether an antenna will adhere to emissions control or not, with respect to the defined EMCON region. An Antenna Metric is calculated to determine how good or bad the antenna is. The metric considers the (new) antenna pointing, antenna radiation pattern (in terms of mainlobe, sidelobes and beamwidth), the location of the EMCON region and the signal quality, in terms of SNR, in the direction of the EMCON region.

The antenna pointing (i.e. in what direction is the antenna pointing) is determined by considering the antenna mount, node attitude and position. In one embodiment, the position of the node is provided by satellite data, and attitude based on inertial data. Firstly, the "new" antenna mount is determined as a function of current antenna mount, node attitude and node position. Once the antenna mount vectors have been modified, the "new" antenna pointing direction is then determined. SNR varies with distance between two points, decreasing in value as the distance increases. At a particular distance between the two points, the SNR is low enough that the signal becomes undetectable. Hence, a given antenna could be pointing towards the EMCON region, but its emission at certain distance from the node is below a SNR threshold. In which case, there is no EMCON violation. The distance can be defined as the distance from the node to the start of the EMCON region, or the distance from the node to a pre-defined distance before the EMCON region (e.g. 1 Nautical Mile before EMCON region begins).

An exemplary method that can be used to calculate the metric is illustrated schematically in FIG. 12 of the drawings, and will be described later.

Thus, referring back to FIG. 11, the method proceeds with selecting the best antenna or antennas from among a plurality of on-board antennas for use while operating under emissions control. Note: the selection does not mean that the antenna will be suitable to route a message in an expedient fashion to the destination, for example in terms of throughput or latency. The path from the node to the recipient will need to be assessed in terms of link and network performance, and the application's communications requirements in order to deliver a message.

Referring to FIG. 11 of the drawings, the method described above in relation to FIG. 10 can be expressed and illustrated in a different manner, and the illustrated flow chart of FIG. 11 demonstrates the process of antenna analysis and selection whilst considering emissions control for a given antenna. Thus, the antenna selection unit receives data representative of the location of the EMCON region and then, for each antenna, determines antenna position, calculates a "new" antenna location/mount, calculates a "new" antenna pointing, determines the "goodness" of the antenna to adhere to EMCON, and finally selects the best antenna(s).

Figure 12:
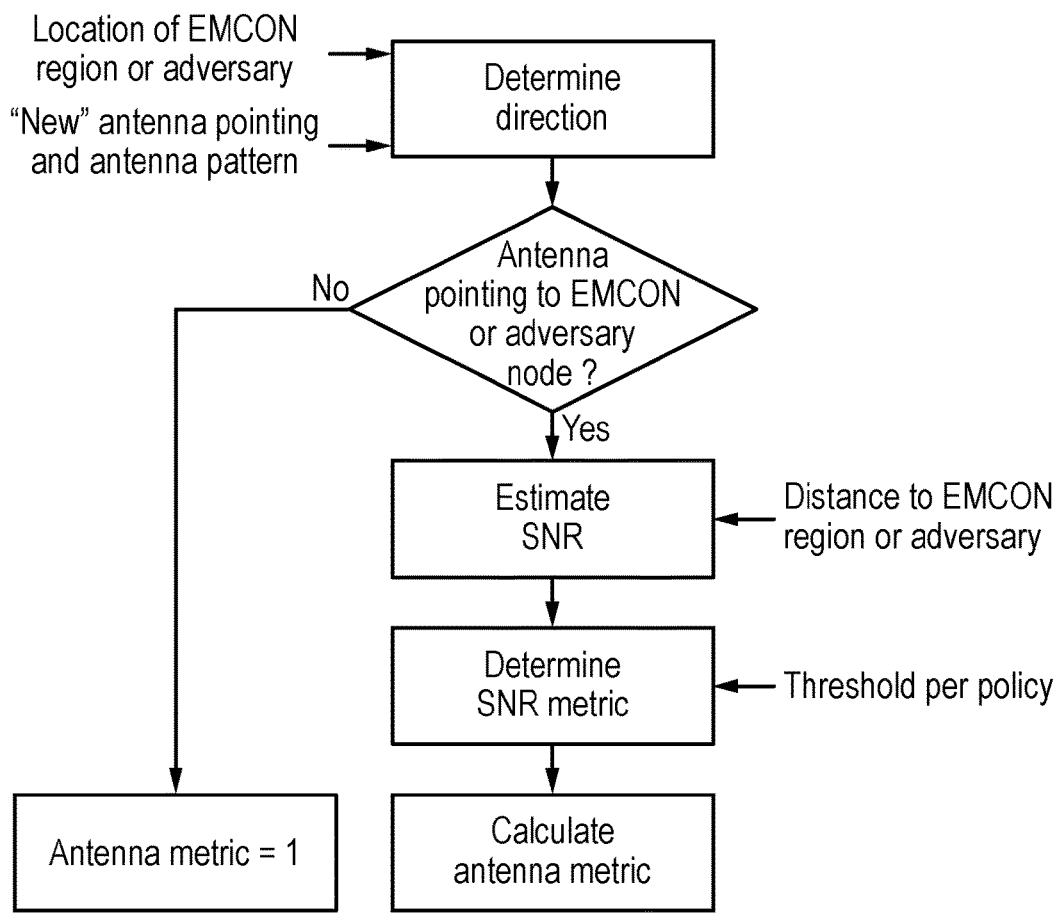
FIG. 12 is a flow chart illustrating the principal steps of an exemplary implementation of antenna "goodness" function for use in a method according to an exemplary embodiment of the present invention.

Referring to FIG. 12 of the drawings, there is provided a flow chart which is illustrative of the principal steps that may be performed in the implementation of an exemplary antenna "goodness" function, as described above.

The illustrated method describes how the suitability of an antenna for communications is determined while operating under EMCON or avoiding to be heard by an adversary.

The first step starts by determining whether the antenna is pointing in the direction of the EMCON region or adversary. This is based on the antenna pointing vector, antenna radiation pattern and the location of the EMCON region or adversary with respect to the node. A binary 1 or 0 may be used to represent whether the antenna is pointing in the direction of the EMCON region or adversary node, or not.

The next step estimates the SNR at a given distance from the node in the direction of the EMCON region. The Friis Transmission equation may, for example, be used to estimate the SNR, but other appropriate equations will be apparent to a person skilled in the art. For example, the distance can be defined as the distance from the node to the start of the EMCON region, or the distance from the node to a pre-defined distance before the EMCON region (e.g. 1 Nautical Mile before EMCON region begins).

The method proceeds by determining a SNR Metric based on the estimated SNR to determine if the SNR will violate EMCON or not. The SNR Metric can be a value in the range of 0 and 1. In one embodiment, a look-up table can then be used to map the SNR metric directly to two QoS states of high SNR and low SNR.

The final step calculates an Antenna Metric. The Antenna Metric can be based on the SNR Metric.

In one embodiment, the antenna selection method uses current node position/attitude, for example, and future values to determine the best antenna(s) to use. The future values can be based on predicted or a priori knowledge of future node trajectory and/or route and/or attitude. As an example, based on the current attributes an antenna will adhere to EMCON, but in the future it will no longer adhere to EMCON. As a result, the antenna can be given a low metric (i.e. not suitable).

In some exemplary embodiments, the antenna selection result may be accompanied by one or more additional plan elements for enabling the antenna selection to be performed adequately, whilst adhering to prevailing EMCON conditions. This requires co-ordination with the platform's management system or an on-board authority with executive decision functionality. Thus, in one exemplary embodiment, antenna selection combined with a node manoeuvre may be required to maintain communications without violating emissions control.

Thus, the additional method steps would start with determination of the optimal attitude (e.g. heading) and/or position of a node, by considering a plurality of factors: node velocity, antenna location, pointing and gain characteristics as source and recipient, mission environment, constraints, communication requirements of one or more relevant applications, and predicted future trajectory (in relation to the current mission plan) of the recipient node or source node over some period of time. The on-board dynamic communications planner 150 determines the optimal attitude and/or position of the node with respect to the recipient or source, derives a node manoeuvre plan to achieve that node attitude and/or position and (optionally) also calculates a plan metric for the manoeuvre plan. Next, a request is generated and transmitted to the node's route planner to devise a route plan to achieve the desired attitude and/or position, as determined in the previous step.

In many cases, authorisation from a designated authority may be required to endorse the plan. If a plan is accepted, the communications system is informed accordingly such that the selected antenna data is provided in a communications plan for implementation via the antenna controller, as described above, and data representative of the node manoeuvre plan is transmitted to the vehicle management system 156 for execution.

In another exemplary embodiment, antenna selection combined with power control can be used to maintain communications without violating emissions control, and in this case, the antenna selection data, together with power control data, may be transmitted to one or more controllers for implementation of the selected antenna and its respective transmission power.

As explained above, in the event that it is determined that, the emissions management system (500, FIG. 5) may generate a revised emissions plan, in which the transmission power is adjusted to an acceptable level, high enough to maintain an existing communications link with the recipient, but low enough to prevent detection or interception of the source node.

Figure 8:
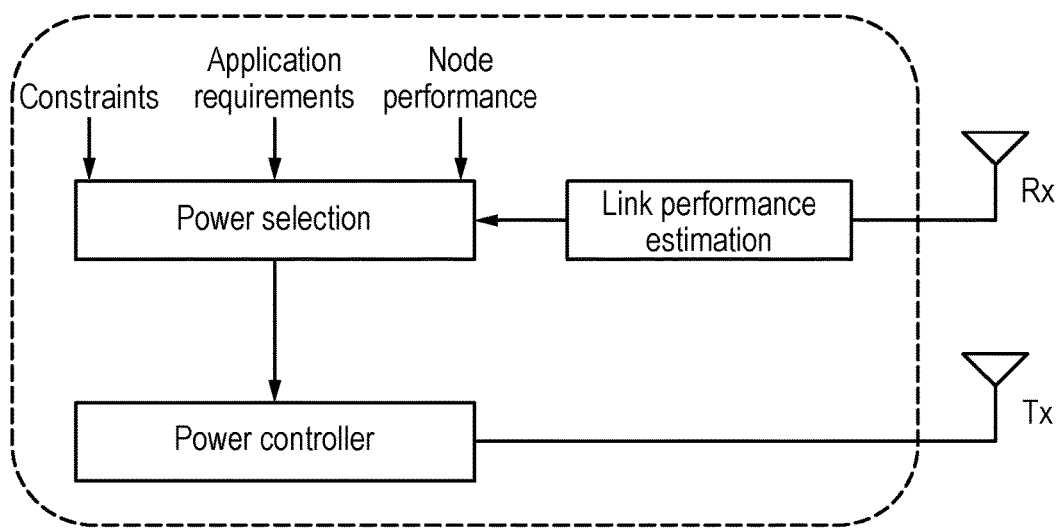
FIG. 8 is a schematic block diagram illustrating a power selection system for use in exemplary embodiments of the present invention.

Thus, referring to FIG. 8 of the drawings, the emissions plan may comprise or include the selection of a transmission power for a communications link. The emissions management system may include a power selection module, to find the optimal transmission power that is high enough to effectively communicate, but low enough not to be detected or intercepted by an adversary. The emission management system provides its Emissions Plan to the communications system, so as to cause the communications system's power controller to adapt the transmission power based on the selected optimal transmission power for a given communications link, without violating EMCON restrictions.

Figure 9:
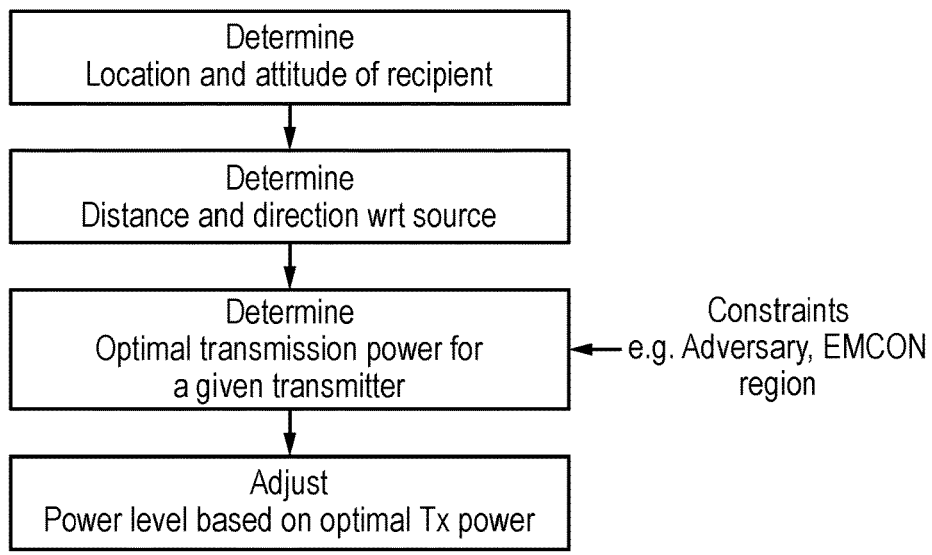
FIG. 9 is a flow chart illustrating the principal steps of a power control method according to an exemplary embodiment of the present invention.

FIG. 9 is a flow chart illustrating an exemplary embodiment for power selection for a given communications link. The method starts with determining the position and/or attitude of the recipient node. In one embodiment, the position and attitude of other node(s) can be obtained via in-mission updates. For example, the node broadcasts its own position and heading. In another embodiment, the position of a fixed node is determined by accessing the database. In yet another embodiment, the position of a mobile node is predicted based on past location and heading data, for example, (shared via broadcasts). In yet another embodiment, location and attitude can be inferred from previously received messages from a node.

The method proceeds with determining a vector (in terms of relative distance and direction) between the source and recipient node.

The method proceeds with determining the optimal transmission power. This step may consider one or more of a plurality of parameters such as the relative distance between nodes, current/estimated signal quality at the recipient, antenna gain and pointing, losses (e.g. atmospheric and antenna pointing) and applications' communications requirement, as well as the prevailing EMCON restrictions. In one implementation, the signal quality at the recipient may be obtained via feedback messages.

The method proceeds with adjusting the transmission power based on the determined optimal transmission power.

Figure 10:
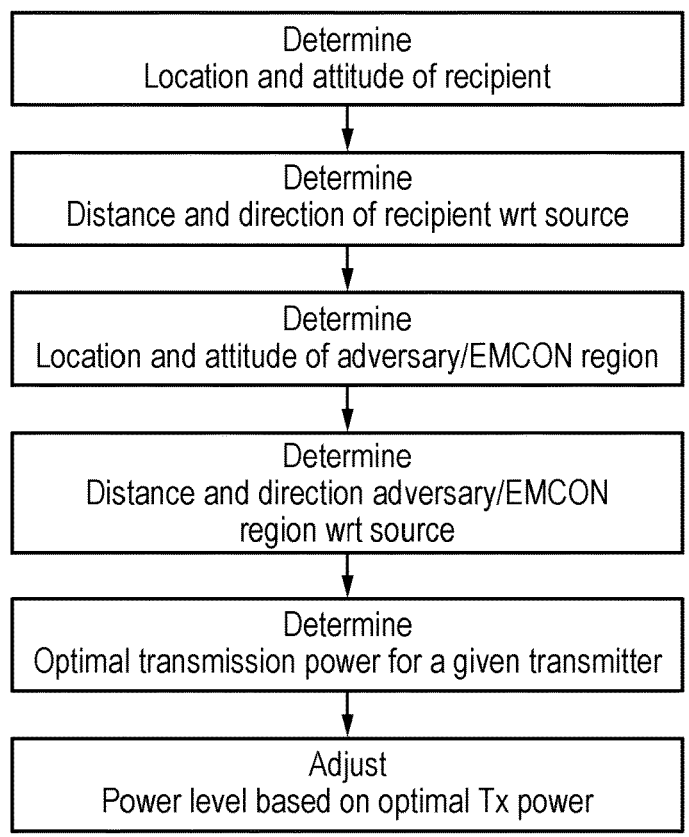
FIG. 10 is a flow chart illustrating, in more detail, the steps of a power control method according to an exemplary embodiment of the present invention.

FIG. 10 is a flowchart illustrating, in more detail, an exemplary embodiment for power selection whilst under Emission control. The aim is to select the optimal transmission power that is high enough to effectively communicate, but low enough not to be detected by an adversary.

The method starts with determining the position and/or attitude of the recipient node. The information can either be obtained via in-mission updates, determined by accessing a database, based on predicted past information or inferred from previously received messages from a node.

The method proceeds with determining a vector (in terms of relative distance and direction) between the source and recipient node.

The method proceeds with determining the position and/or attitude of the EMCON region or adversary. The information can either be obtained via in-mission updates or determined by accessing a database.

The method proceeds with determining a vector (in terms of relative distance and direction) between the node and EMCON region/adversary node.

The method proceeds with determining the optimal transmission power to achieve a desired link quality. This step considers a plurality of parameters such as the relative distance between nodes, transmitter power range, platform power budget, antenna gain and pointing, losses (e.g. atmospheric and antenna pointing) and applications' communications requirement. This step assesses the signal quality (e.g. SNR) at the adversary for a given transmission power and is compared against a threshold, when finding the optimal transmission power. The selection is based on the transmission power that maximizes the signal quality (e.g. SNR) at the desired recipient to achieve the desired link quality, without being detected at the adversary or violating EMCON.

The method proceeds with adjusting the transmission power based on the determined optimal transmission power.

In another exemplary embodiment, there can be multiple adversaries spatially distributed and power selection considers their locations and selects the optimal transmission power to communicate with the recipient, without being detected by the adversaries.

In another exemplary embodiment, there may be multiple nodes/platforms in the operational environment and due to the nature of wireless communication, signals interfere with each other. Power selection considers the coexistence of other nodes/platforms and selects the optimal transmission power to communicate with the intended recipient(s), whilst minimising interference among nodes/platforms sharing the same space.

In another exemplary embodiment, there may be multiple communications links and multiple systems co-located on the same platform/node (e.g. navigation, sensors) and signals may interfere with each other. Power selection considers their location on the node/platform and selects the optimal transmission power to communicate with the recipient(s), whilst minimising interference among other communications links and other systems on its own platform/node.

In yet another exemplary embodiment, the emissions plan may comprise or include the selection of a suitable (alternative) communications link. In practice, the emissions management system may include a link selection and analysis module, that identifies one or more suitable communications links for message flow between a source and recipient node, calculates a transmitter metric in respect of the identified communications links, and then selects the 'best' transmitter(s) that will adhere to EMCON. The link analysis takes into account current position and/or attitude of the source and/or recipient nodes, including (optionally) future predicted values. Of course, link selection, by definition, may also be accompanied by a node manoeuvre and/or power control in order to further optimise the selected link, whilst adhering to EMCON.

In the above-described embodiment, the emissions planning element actually produces a communications plan incorporating the emission control parameters as part of the planning process. In an alternative exemplary embodiment of the invention, an emissions management (or planning) module is provided that generates an emissions plan and then transmits the emissions plan, or data representative thereof, to a dynamic planning module, wherein it is the dynamic planning module that actually generates the communications plan using the emissions plan data accordingly.

Thus, in another exemplary embodiment, an emissions management module is provided for generating and updating an emissions plan for use by other on-board systems, such as the communications system or the sensor system. For example, the emissions plan, thus generated/updated, may be used by the dynamic communications planner 40 to generate a communications plan that meets information exchange requirements, whilst adhering to emissions control restrictions.

An exemplary embodiment of the invention provides an emissions management module configured to provide (and update) an emissions plan and make it available to other on-board systems with a view to providing a resource for:

management of emissions from the platform (i.e. controlling the level of emissions that the various parts of the system are allowed to make) to minimise the probability of the platform being detected passively through its own RF emissions; and management of measures taken to protect other (friendly) assets in the operational environment, i.e. controlling emissions that could potentially set off some types of munitions or interfere with a system on-board a neighbouring asset.

For communications, the emissions management module determines permissible communications resources in terms of, say, permissible waveforms as well as transmission power limit ('emissions limit'); whereas, for the sensor system, the relevant part of the emissions plan would define tasks which cannot be performed by the radar whilst adhering to current emissions control (EMCON) restrictions.

In an exemplary embodiment, the emissions plan may be updated if any or all of the following unplanned events occur:

appearance of pop-up threat(s);
a route change (e.g. to avoid a pop-up threat);
the aircraft mode changes (e.g. switching from autopilot to manual mode).

Figure 13:
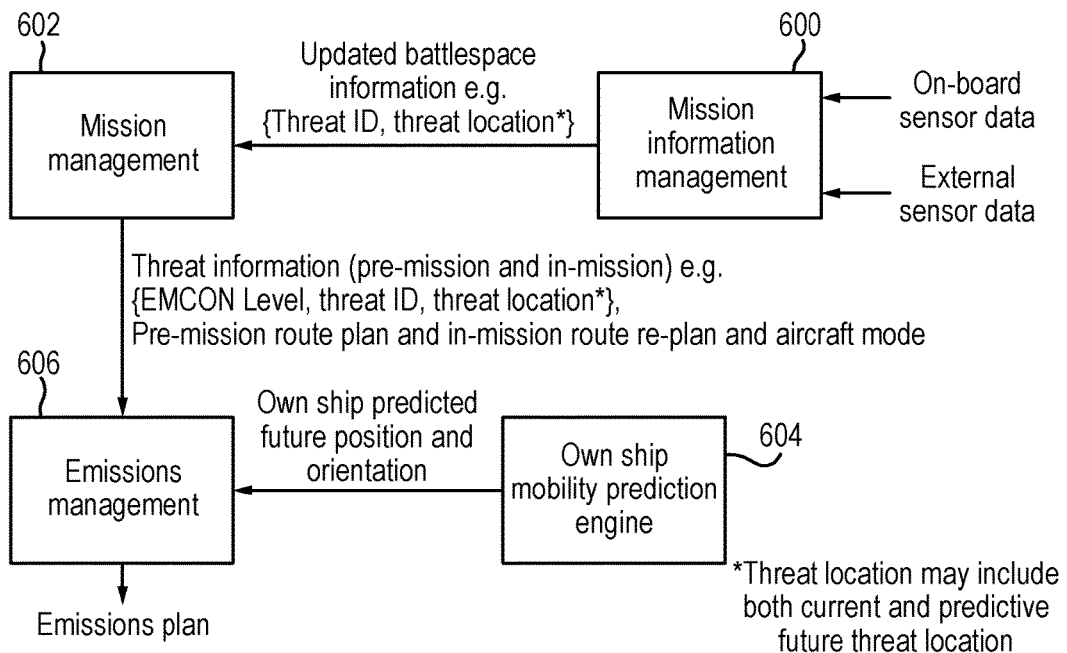
FIG. 13 is a schematic block diagram illustrating an emissions management apparatus according to an exemplary embodiment of the present invention.

Thus, referring to FIG. 13 of the drawings, an on-board management system may comprise a mission information management module 600, a mission management module 602, an own ship mobility prediction engine 604 and an emissions management module 606 according to an exemplary embodiment of the present invention.

The mission information management module 600 is configured to fuse data from external sources (e.g. teammate sensors), on-board sensors and datalinks to produce a degree of 'situational awareness' about threat entities and other entities (e.g. friends, neutrals and unknowns) in the operating space with respect ton the moving platform, as well as that of other entities.

The mission management module 602 receives situational awareness data from the mission information management module 600, for example, about a pop-up threat, and then determines the EMCON level for each threat and other entities that the on-board platform system(s) must adhere to. The mission management module 602 also has (or access to) data regarding pre-mission known threat location(s).

The emissions management module 606 receives data regarding the threat(s), such as threat location, threat type, threat category and the EMCON level for a given threat, as well as information concerning friendly or other assets ('Other Asset Location'). Threat Location and Other Asset Location data are expressed in three dimensions: latitude, longitude and altitude. Furthermore, location data may include current threat location, location error in three dimensions and predicted future location, e.g: current threat location+threat location error+predicted future threat location.

The emissions management module 606 also receives data regarding the movement of its own platform, such as (from the mission management module 602) predetermined route plan or updated route plan (e.g. generated to avoid a pop-up threat), and (from the own ship mobility prediction engine 604) future prediction information about its own platform.

Figure 14:
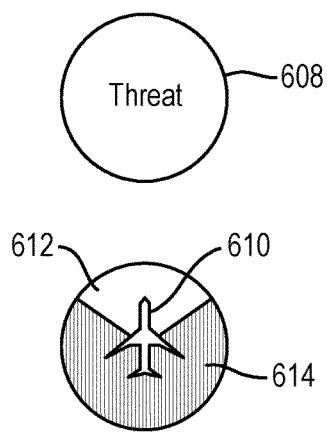
FIG. 14 is a schematic diagram illustrating the extent of emissions plans generated by apparatus according to an exemplary embodiment with reference to a moving platform and a threat.

Based on the above-mentioned information, the emissions management module generates an emissions plan in the direction of the threat and/or other entities. For example, and referring to FIG. 14 of the drawings, a threat 608 and a mobile platform 610 is illustrated schematically. An emissions plan, generated by an emissions management module on-board the mobile platform 610, identifies permissible resources per direction. Thus, in the illustrated example, there is an emissions plan in the direction of the threat (segment 612) and there is another emissions plan in other directions, in this case where there is no threat (segment 612). The permissible resources identified in the emissions plan(s) may comprise permissible waveform(s), emissions duration, etc. as well as transmission power (or 'emissions limit').

In one exemplary embodiment, an Emissions Plan may be generated based on a pre-planned route and pre-mission static, known threat(s). In another exemplary embodiment, an Emissions Plan is generated based on a pre-planned route and (static or dynamic) pop-up threat(s). In yet another exemplary embodiment, an Emissions Plan is generated based on dynamic movement of own aircraft and a dynamic pop-up threat(s). For example, dynamic movement of own aircraft means that the aircraft is no longer following a pre-planned route (for a manned aircraft, pilot has taken over).

Figure 15:
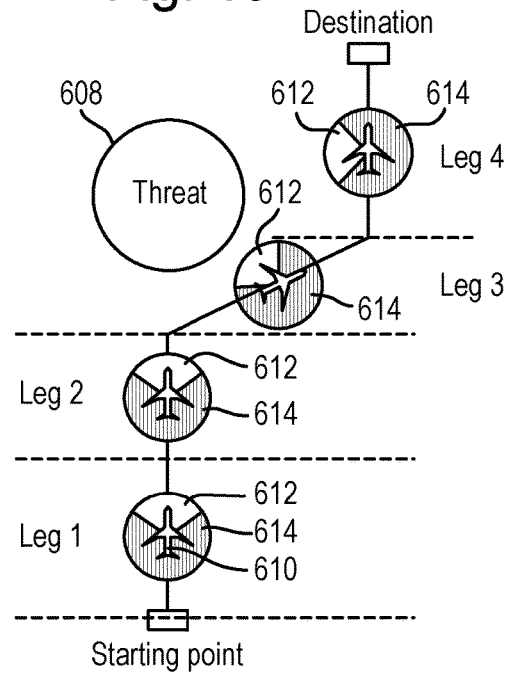
FIG. 15 is a schematic diagram illustrating the principles of generating an emissions plan in respect of each of a plurality of legs of a route of a moving platform.

FIG. 15 of the drawings illustrates an example of a pre-planned route an aircraft 610 will follow and location of a static threat. The emissions management module generates one or more Emissions Plans as the aircraft flies its pre-planned route. It uses the pre-determined route plan to generate the Emissions Plans. Thus, for each leg or segment along the route, there is an Emissions Plan in the direction of the threat 608 (segment 612) and in other directions (segment 614).

In another exemplary embodiment, when the pilot takes over (i.e. aircraft mode is no longer on autopilot), for example to pursue a threat, then the aircraft will no longer be flying a pre-planned route. In such a case, the emissions management module cannot use the pre-planned route to generate an Emissions Plan. Hence, a prediction engine 604 is required to predict future location of its own ship (aka own aircraft). This information is then used by the emissions management module to generate an Emissions Plan. Note: future prediction data may also be combined with current and historical known location to provide a better understanding about future location of its own ship.

The Emissions Plan(s) can be generated pre-mission for the entire route, based on the known Route Plan. In such a case, any changes to the route or appearance of new threats may require a full re-plan. Alternatively, the Emissions Plan(s) can be dynamically carried out in-mission, making it more adaptable to any unplanned events; the process is carried out between waypoints, for example; this process can be referred to as forward Emissions Planning.

Figure 16:
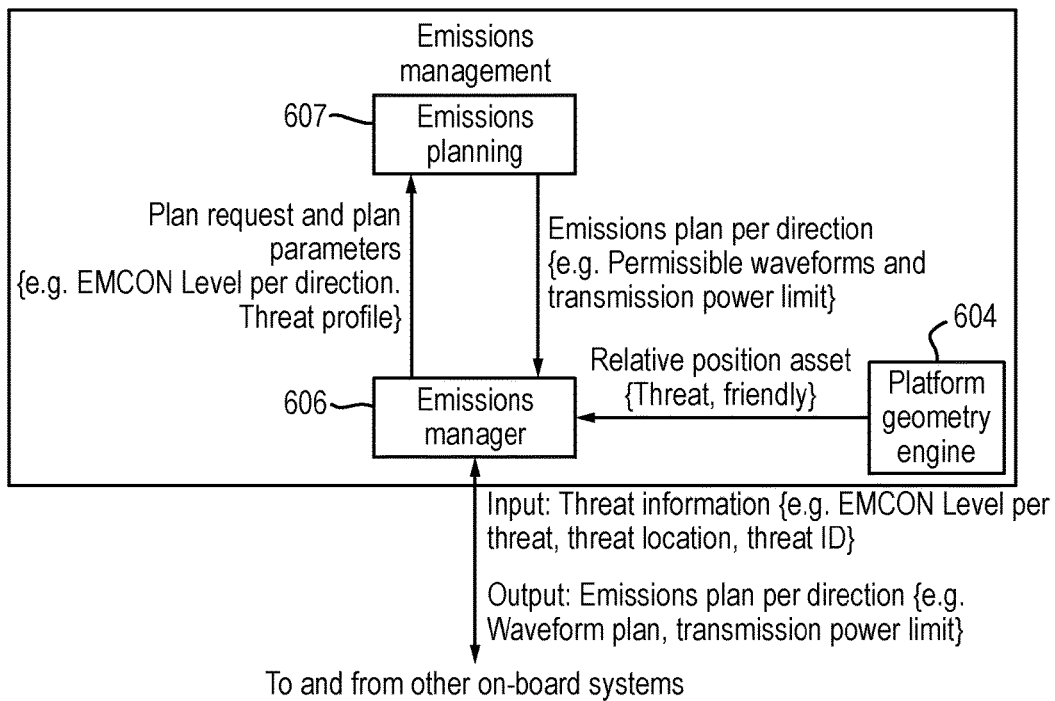
FIG. 16 is a schematic block diagram illustrating an emissions management module according to an exemplary embodiment of the present invention.

The following describes an embodiment of the emissions management module. Referring to FIG. 16 of the drawings, there may be three principal functions within the emissions management module: an Emissions Manager 606; one or more Emissions Planner(s) 607; and a Platform Geometry Engine 604.

An Emissions Manager 606 interfaces with the Emissions Planner 607, Platform Geometry Engine 604 and with external on-board systems, such as Mission Management, and Communications Planning and Management system.

An Emissions Planner 607 determines permissible resources per direction, such as permissible Waveforms and transmissions power limit.

A Platform Geometry Engine 604 determines relative position to threat and to non-threat assets (in terms of Azimuth, Elevation and Slant Range).

A method according to an exemplary embodiment can be described as follows:

1. Emissions Manager 606 receives information (from Mission Management) regarding the threat(s), such as threat location, threat ID and EMCON Level for a given threat, as well as receiving information about non-threat assets.
2. Platform Geometry Engine 604 receives threat and/or non-threat information, for example location data in terms of longitude, latitude and altitude, as well as own aircraft location data. Based on the received information, Platform Geometry Engine determines the relative position to threat (in terms of azimuth, elevation, and slant range) and/or relative position of own ship to non-threat (e.g. friendly assets). Relative Position information for a given threat and/or non-threat asset is then made available to the Emissions Manager.

Note: Relative Position information may be provided as a range, for example {AZmin to AZmax, ELmin to ELmax, SLANTmin to SLANTmax}.

3. The Emissions Planner 607 receives from the Emissions Manager a request for an emissions plan and associated plan parameters; plan parameters include non-threat/Threat ID (e.g. type), relative position to threat and non-threat, and EMCON Level per threat/non-threat.
4. The Emissions Planner 607 also has access to pre-defined look-up tables, which it uses in its planning. Pre-mission defined tables provide relevant information to the planner to enable it to generate an appropriate Emissions Plan for different EMCON Levels, threat types and non-threat types. It also has information regarding the different threat types and non-threat types, such as receiver sensitivity and frequency band(s).
5. The Emissions Planner 607 determines permissible Waveform(s) and associated Emissions Limit (e.g. transmission power, emissions duration) in a given direction, using the abovementioned information. It then submits the Emissions Plan to the Emissions Manager for validation.
6. Once the received Emissions Plan is validated by the Emissions Manager, the Emissions Manager 606 then publishes the Emissions Plan. The Emissions Plan(s) are then used by the Communications Planning and Management function and/or Sensing Management function.

Emissions Planning

For specific EMCON Levels, the permissible Waveforms and Emissions Limit (e.g. transmission power) can be determined pre-mission. The permissible waveforms and power limits for specific EMCON Levels can be obtained from pre-mission defined look-up tables. For example, for a specific EMCON Level, all waveforms are permissible and there is no transmissions power restriction, in a particular direction. In another example, for another EMCON Level, no waveforms are permissible and there is no transmissions power is allowed, in a particular direction.

For other EMCON Levels, the permissible waveform and Emissions Limit (e.g. transmission power) is determined in-mission. The Emissions Limit (transmission power and emissions duration) will need to be calculated based on threat information (e.g. threat type, receiver sensitivity and relative position to threat), and the permissible Waveform(s) will depend on the type of threat.

The Emissions Limit depends on what the aircraft is trying to achieve.

A. For example, if the aim is to avoid detection (i.e. the aircraft's transmission cannot be heard by the threat), the Emissions Limit is set to below the threat's receiver sensitivity to detect an RF signal; the emissions limit can be based on maximum permissible EIRP, in a given direction.

The "Effective Isotropic Radiated Power" (EIRP) (used to determine the Emissions Limit) can be calculated by using the well-known Friis Equation.

B. In another example, the aircraft's transmission can be heard by the threat, but the transmission time must not be long enough for threat to lock on and decode it. Thus the Emissions Limit may include an emissions duration value and a transmissions limit; the transmission limit can be expressed in terms of Energy, which is a function of the threat's lock-on period.

If the platform needs to protect other non-threat assets in the operational environment (e.g. controlling emissions that could potentially set off some types of munitions or protect against interference with a system on-board another asset), then an Emissions Plan in the direction of the friendly asset is generated. The Emissions Plan may identify a subset of permissible waveforms and an Emissions Limit, based on non-threat information, such as non-threat location and non-threat profile (e.g. receiver sensitivity, frequency bands).

It will be apparent to a person skilled in the art, from the foregoing description, that modifications and variations can be made to the described embodiments without departing from the scope of the invention as defined by the appended claims.

What is claimed is:

1. An emissions management module for a mission management system of a moving platform to reduce an emissions signature of said platform in response to a threat located relative to said platform, said emissions management module being configured to:
   obtain attribute data representative of (i) prevailing emissions control (EMCON) parameters in the form of an emissions control region defined by the relative locations of said platform and another node;
   generate, using said attribute data, an emissions plan that complies with restrictions defined by said emissions control parameters, and includes at least an emissions limit defining:
      a maximum transmission power permitted to be utilised by an on-board antenna or portion of aperture antenna in a specified direction relative to said moving platform; and
      permissible antenna waveforms; and
      a specified maximum emissions duration in said specified direction relative to said moving platform; and
   permit and restrict usage of on-board sensors in said specified direction relative to said moving platform;
   whereby said emissions signature of said platform is reduced in response to said threat.

2. The emissions management module according to claim 1, wherein the data representative of prevailing emissions control parameters comprises location data representative of a specified emissions control region and location data representative of an adversary node defining an emissions control region.

3. The emissions management module according to claim 1, configured to generate a plurality of emissions plans relating to a respective plurality of specified directions relative to said moving platform; and to generate at least one emissions plan in respect of a planned or predicted route of said moving platform.

4. The emissions management module according to claim 1, configured to generate a plurality of emissions plans in respect of a respective plurality of portions of a planned or predicted route of said moving platform.

5. The emissions management module according to claim 1, configured to generate an updated emissions plan in response to an unplanned event.

6. The emissions management module according to claim 5, wherein said unplanned event comprises one or more of the detection of a pop-up threat, a route change of said moving platform, and a change of platform mode of operation.

7. The emissions management module according to claim 1, wherein said attribute data comprises data representative of a location of said threat relative to said moving platform and another node, an emissions control level associated with said threat and threat profile information.

8. An apparatus for communications management in respect of a moving platform comprising at least one platform application and a communications system, said communications system being arranged and configured to effect data communication between said platform and another node by means of a supported wireless communications link in accordance with a communications plan, wherein said apparatus comprises an emissions management module according to claim 1.

9. The apparatus according to claim 8, configured to:
receive data representative of a communications requirement between said platform and another node; and
generate said emissions plan for use in generating a communications plan for supporting said communication requirement between said platform and said other node.

10. The apparatus according to claim 8, further comprising a communications planning module, wherein said emissions management module is configured to:
generate emissions plan data representative of said emissions plan and transmit said emissions plan data to said communications planning module;
said communications planning module being configured to:
in response to receipt of said emissions plan data, determine, which of a plurality of available on-board antennas is permissible for use to comply with said restrictions defined by said emissions plan; and
select a permissible antenna and include data representative of said permissible antenna in a communications plan.

11. The apparatus according to claim 10, wherein said communications planning module is configured, in generating said communications plan, to perform a power selection process for selecting a transmission power of one or more antennas designated in said communications plan to comply with said emissions limit defined in said emissions plan.

12. The apparatus according to claim 11, wherein said communications planning module is configured to determine a best achievable transmission power to achieve a desired wireless link quality, using data representative of one or more of: relative distance between said platform and a recipient node, relative distance between said platform and said EMCON region/adversary node, communications link power range, platform power budget, antenna gain and antenna pointing, losses (e.g. atmospheric loss, free-space propagation loss), and communications requirements of said at least one platform application.

13. The apparatus according to 8, further comprising a platform geometry engine module for providing to said emissions management module data representative of a position and orientation of said platform relative to said other node and said other node relative to said moving platform.

14. The apparatus according to claim 8, further comprising a platform geometry engine module for providing to said emissions management module data representative of said direction of said emissions control region with respect to said platform.

15. A method for emissions management in respect of a moving platform to reduce an emissions signature of said platform in response to a threat located relative to said platform, comprising:
obtaining attribute data representative of (i) prevailing emissions control (EMCON) parameters in the form of an emissions control region defined by the relative locations of said platform and said other node;
generating, using said attribute data, an emissions plan that complies with restrictions defined by said emissions control parameters, and includes at least an emissions limit defining:
a) a maximum transmission power permitted to be utilised by an on-board antenna or portion of aperture antenna in a specified direction relative to said moving platform; and
b) permit and restrict usage of on-board sensors in said specified direction relative to said moving platform;
whereby said emissions signature of said platform is reduced in response to said threat.

* * * * *